US012619203B2

(12) United States Patent
Chen et al.

(10) Patent No.: US 12,619,203 B2
(45) Date of Patent: May 5, 2026

(54) SWITCH SWITCHING METHOD AND RELATED APPARATUS

(71) Applicant: Honor Device Co., Ltd., Shenzhen (CN)

(72) Inventors: Dan Chen, Shenzhen (CN); Cheng Jiang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 788 days.

(21) Appl. No.: 17/913,554

(22) PCT Filed: Apr. 12, 2022

(86) PCT No.: PCT/CN2022/086439
§ 371 (c)(1),
(2) Date: Sep. 22, 2022

(87) PCT Pub. No.: WO2022/257592
PCT Pub. Date: Dec. 15, 2022

(65) Prior Publication Data
US 2024/0126224 A1     Apr. 18, 2024

(30) Foreign Application Priority Data

Jun. 11, 2021    (CN) .......................... 202110654892.7

(51) Int. Cl.
G05B 15/02          (2006.01)
(52) U.S. Cl.
CPC .................................... G05B 15/02 (2013.01)
(58) Field of Classification Search
CPC ............... G05B 15/02; G05B 19/0423; G05B 2219/25257; H04B 1/18; Y02D 10/00
See application file for complete search history.

(56) References Cited

U.S. PATENT DOCUMENTS 6,223,208 B1     4/2001   Kiefer et al.
2006/0208767 A1   9/2006   Kawashima et al.
(Continued)

FOREIGN PATENT DOCUMENTS

CN          105720380 A      6/2016
CN          106788577 A      5/2017
(Continued)

OTHER PUBLICATIONS

A Snapshot on MIPI RFFE v3.0 from A Systems Architecture Perspective, MIPI DevCon 2020.*

*Primary Examiner* — Zhitong Chen
(74) *Attorney, Agent, or Firm* — Conley Rose, P.C.

(57)          ABSTRACT

A switch switching method and a related apparatus. The method includes: receiving, by an MIPI switch, an MIPI instruction, and parsing the MIPI instruction preliminarily, to obtain an address and a control instruction in the MIPI instruction; determining, by the MIPI switch, whether the address in the MIPI instruction is the same as an address of the MIPI switch; if the addresses are the same, writing the control instruction into a data register of the MIPI switch; transmitting, by the MIPI switch, the control instruction in the data register of the MIPI switch to a mode identification module; determining, by the mode identification module, which control instruction bits control the MIPI switch, and sending these control instruction bits to a translator in the MIPI switch; and translating, by the translator in the MIPI switch, the control instruction into a component status.

17 Claims, 18 Drawing Sheets

(56)      References Cited

U.S. PATENT DOCUMENTS

2017/0331188 A1   11/2017  Fei et al.
2018/0121384 A1    5/2018  Podsiadlo et al.
2019/0036217 A1*   1/2019  Presti ....................... H01Q 5/50

FOREIGN PATENT DOCUMENTS

CN          106849987 A     6/2017
CN          206432987 U     8/2017
CN          107302136 A    10/2017
CN          108768420 A    11/2018
CN          110300221 A    10/2019
CN          110581357 A    12/2019
CN          110727381 A     1/2020
CN          111969285 A    11/2020
CN          112152661 A    12/2020
CN          106788577 B  *  2/2021  .......... H04B 7/0602
CN          113485173 A    10/2021

* cited by examiner

| Bit 7 | Bit 6 | Bit 5 | Bit 4 | Bit 3 | Bit 2 | Bit 1 | Bit 0 |
|-------|-------|-------|-------|-------|-------|-------|-------|
| X | X | X | X | X | X | X | X |

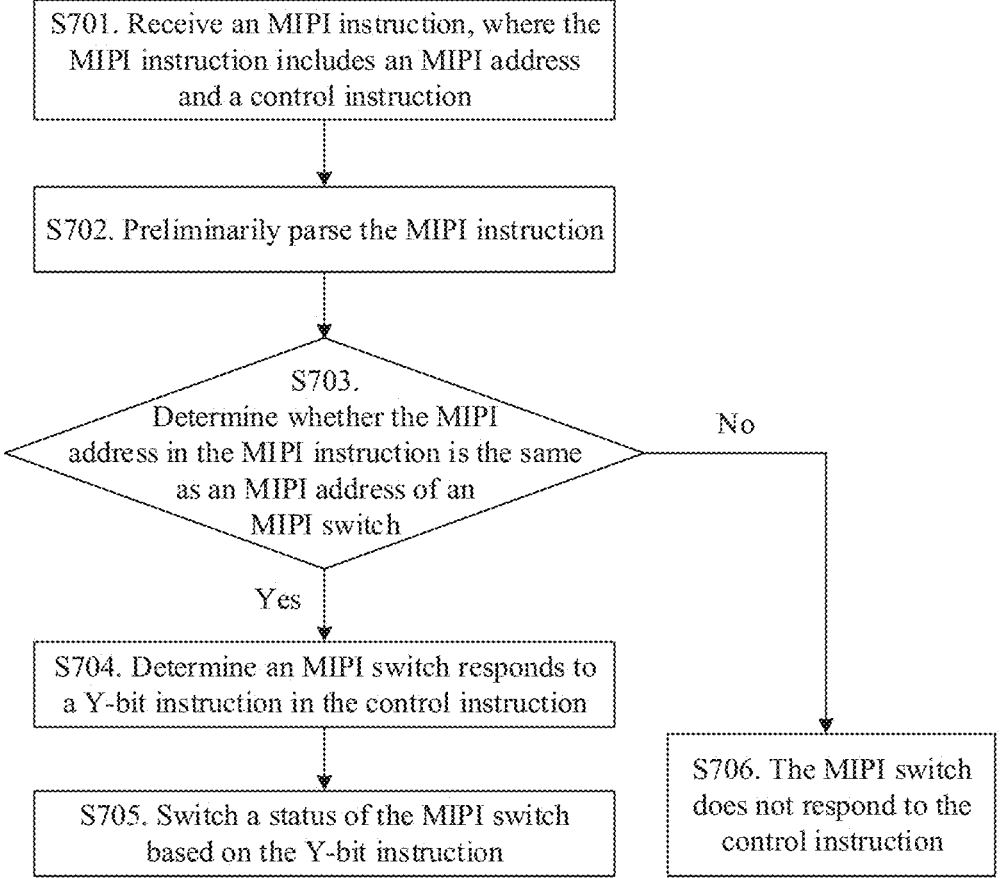

S701. Receive an MIPI instruction, where the MIPI instruction includes an MIPI address and a control instruction S702. Preliminarily parse the MIPI instruction S703. Determine whether the MIPI address in the MIPI instruction is the same as an MIPI address of an MIPI switch No Yes S704. Determine an MIPI switch responds to a Y-bit instruction in the control instruction S705. Switch a status of the MIPI switch based on the Y-bit instruction S706. The MIPI switch does not respond to the control instruction

FIG. 7

SWITCH SWITCHING METHOD AND RELATED APPARATUS

CROSS-REFERENCE TO RELATED APPLICATIONS

This application is a U.S. National Stage of International Application No. PCT/CN2022/086439 filed on Apr. 12, 2022, which claims priority to Chinese Patent Application No. 202110654892.7, filed with the China National Intellectual Property Administration on Jun. 11, 2021, both of which are incorporated herein by reference in their entireties.

TECHNICAL FIELD

This solution relates to the field of radio frequency technologies, and in particular, to a switch switching method and a related apparatus.

BACKGROUND

With continuous development of technologies, increasing of a quantity of antennas day by day requires more and more switching statuses. Thus, a quantity of antenna switches also increases. In the conventional technology, each switch is assigned one MIPI address, switches receive MIPI instructions in series. This results in a long switch response time. In addition, a platform limits a quantity of MIPI instructions, and one MIPI instruction acts on one switch. This limits a quantity of switches, and severely limits antenna design.

Therefore, how to reduce a response time of the switch and overcome a limitation of the platform on the quantity of switches is a problem to be resolved urgently at present.

SUMMARY

This application provides a switch switching method and a related apparatus, so that a plurality of MIPI switches can share one MIPI address, that is, one MIPI instruction controls a plurality of MIPI switches. This not only overcomes a limitation of a platform on a quantity of MIPI switches, but also reduces response time of the MIPI switch and a switching latency of the MIPI switch.

According to a first aspect, this application provides a switch switching method, and the method may be applied to a mobile industry processor interface MIPI switch. In this method, the MIPI switch can receive an MIPI instruction. The MIPI switch may include a first pin. The MIPI instruction may include a control instruction. The MIPI switch may determine a Y-bit instruction in the control instruction based on a status of the first pin when determining that the MIPI instruction is used to control the MIPI switch. The control instruction includes an X-bit instruction, where Y is less than or equal to X. The MIPI switch switches based on the Y-bit instruction.

In the solution provided in this application, the MIPI switch may determine, based on the status of the first pin included in the MIPI switch, which part of the control instruction is to be responded, that is, the Y-bit instruction mentioned in the foregoing method. It may be understood that a translator in the MIPI switch may translate the Y-bit instruction into a component status, that is, control turn-off and turn-on of a sub-switch of the MIPI switch. It should be noted that based on the foregoing method, one MIPI instruction may include different Y-bit instructions. Therefore, one MIPI instruction can be used to control a plurality of MIPI switches. In this method, a switching latency of the MIPI switch can be reduced, so that the MIPI switch responds in a timely manner, and a limitation of a platform on a quantity of MIPI switches can be overcome.

With reference to the first aspect, in a possible implementation, the MIPI switch corresponds to a first MIPI address, and the MIPI instruction includes a second MIPI address. Before that the MIPI switch determines a Y-bit instruction in the control instruction based on a status of the first pin when determining that the MIPI instruction is used to control the MIPI switch, the switch switching method may further include: The MIPI switch parses the MIPI instruction, to obtain the second MIPI address and the control instruction. That the MIPI switch determines a Y-bit instruction in the control instruction based on a status of the first pin when determining that the MIPI instruction is used to control the MIPI switch may specifically include: The MIPI switch determines whether the first MIPI address is the same as the second MIPI address; and if the first MIPI address is the same as the second MIPI address, the MIPI switch determines the Y-bit instruction in the control instruction based on the status of the first pin.

In the solution provided in this application, before the Y-bit instruction responded by the MIPI switch are determined, it needs to be determined whether an address of the MIPI switch is the same as an address in the MIPI instruction. If the address of the MIPI switch is the same as the address in the MIPI instruction, the Y-bit instruction responded by the MIPI switch may be determined based on the status of the first pin, so that the MIPI switch can successfully respond to a corresponding MIPI instruction.

With reference to the first aspect, in a possible implementation, the first pin has N statuses. That the MIPI switch may determine a Y-bit instruction in the control instruction based on a status of the first pin specifically includes: The MIPI switch may determine, based on first control logic, the Y-bit instruction that is in the control instruction and that is corresponding to the status of the first pin, where the first control logic includes correspondences between the N statuses and Y-bit instructions, and different connection statuses correspond to different Y-bit instructions in the control instruction.

In the solution provided in this application, the first pin may be a mode pin. Correspondingly, the MIPI switch may include a mode identification module. The mode identification module may determine, based on the first control logic and a status of the mode pin, a Y-bit instruction that is in the control instruction and that is corresponding to the status of the mode pin. In an embodiment of this application, the mode pin may have two statuses: 1. The mode pin is connected to a high level; and 2. The mode pin is connected to a low level. In still another embodiment of this application, the mode pin may have four statuses: (1) The mode pin is connected to a high level; (2) The mode pin has a load and is connected to a high level; (3) The mode pin is connected to a low level; and (4) The mode pin has a load and is connected to a low level.

With reference to the first aspect, in a possible implementation, a K-bit instruction in the Y-bit instruction is a flag bit instruction, where K is a positive integer not less than 1. That the MIPI switch switches based on the Y-bit instruction may specifically include: If the flag bit instruction indicates a first state, the MIPI switch does not respond to the Y-bit instruction; or if the flag bit instruction indicates a second state, the MIPI switch responds to the Y-bit instruction.

In the solution provided in this application, the flag bit instruction may be set in the Y-bit instruction. The MIPI switch may determine, based on the flag bit instruction in the Y-bit instruction, whether the switch responds to the Y-bit instruction. Therefore, when one MIPI instruction can control a plurality of MIPI switches, each switch controlled by the MIPI instruction does not necessarily need to respond to the MIPI instruction. The MIPI switch may respond to the MIPI instruction when switching between a turn-off state and a turn-on state is required. This can save an unnecessary decoding process, thereby reducing response time of the MIPI switch.

With reference to the first aspect, in a possible implementation, the MIPI switch may further include general-purpose input/output GPIO pins. At least one of the GPIO pins in the MIPI switch is connected to a GPIO switch, and different GPIO pins are connected to different GPIO switches. The switch switching method may further include: The MIPI switch determines, based on second control logic, a Z-bit instruction that is in the control instruction and that is corresponding to the GPIO pins, where the second control logic includes correspondences between the GPIO pins and Z-bit instructions, different GPIO pins correspond to different Z-bit instructions in the control instruction, and Z is less than or equal to X. The MIPI switch switches the GPIO switch based on the Z-bit instruction.

In the solution provided in this application, the MIPI switch may further include a GPIO pin, and is connected to the GPIO switch through the GPIO pin. In addition, the MIPI switch may further control the GPIO switch by using a part of the control instruction. Therefore, not only one MIPI instruction can be used to control the plurality of MIPI switches, but also one MIPI instruction can be used to control the plurality of MIPI switches and at least one GPIO switch. This can implement switching of more types of switches, thereby implementing more convenient switching of a plurality of antenna frequencies.

According to a second aspect, this application provides an MIPI switch, where the MIPI switch may include a pin module, a sub-switch module, and a controller. The pin module may include a first pin. The sub-switch module may include at least one sub-switch. The controller may be configured to receive an MIPI instruction. The MIPI instruction may include a control instruction. The controller may be further configured to: determine a Y-bit instruction in the control instruction based on a status of the first pin when determining that the MIPI instruction is used to control the MIPI switch. The control instruction may include an X-bit instruction, where Y is less than or equal to X. The controller may be further configured to switch the at least one sub-switch based on the Y-b it instruction.

With reference to the second aspect, in a possible implementation, the MIPI instruction includes a second MIPI address. The controller includes an address register, where the address register stores a first MIPI address; a decoder, configured to parse the MIPI instruction to obtain the second MIPI address and the control instruction, and determine whether the first MIPI address is the same as the second MIPI address; a data register, configured to store the control instruction; and a mode identification module, configured to: when the first MIPI address is the same as the second MIPI address, determine the Y-bit instruction in the control instruction based on the status of the first pin.

With reference to the second aspect, in a possible implementation, the first pin has N statuses. When being configured to determine the Y-bit instruction in the control instruction based on the status of the first pin, the mode identification module is specifically configured to determine, based on first control logic, the Y-bit instruction that is in the control instruction and that is corresponding to the status of the first pin. The first control logic includes correspondences between the N statuses and Y-bit instructions, and different connection statuses correspond to different Y-bit instructions in the control instruction.

With reference to the second aspect, in a possible implementation, a K-bit instruction in the Y-bit instruction is a flag bit instruction, where K is a positive integer not less than 1. The controller may further include a translator, configured to switch the at least one sub-switch based on the Y-bit instruction. When being configured to switch the at least one sub-switch based on the Y-bit instruction, the translator is specifically configured to do the following: If the flag bit instruction indicates a first state, the translator does not respond to the Y-bit instruction; or if the flag bit instruction indicates a second state, the translator responds to the Y-bit instruction.

With reference to the second aspect, in a possible implementation, the MIPI switch further includes general-purpose input/output GPIO pins. At least one of the GPIO pins in the MIPI switch is connected to a GPIO switch, and different GPIO pins are connected to different GPIO switches. The translator may be further configured to determine, based on second control logic, a Z-bit instruction that is in the control instruction and that is corresponding to the GPIO pins. The second control logic includes correspondences between the GPIO pins and Z-bit instructions, different GPIO pins correspond to different Z-bit instructions in the control instruction, where Z is less than or equal to X. The controller may be further configured to switch the GPIO switch based on the Z-bit instruction.

According to a third aspect, this application provides an electronic device. The electronic device includes the MIPI switch provided in the second aspect and with reference to any one of the implementations of the second aspect.

According to a fourth aspect, this application provides a computer storage medium, including instructions. When the instructions are run on an MIPI switch or an electronic device, the MIPI switch or the electronic device is enabled to perform the switch switching method provided in the first aspect and with reference to any one of the implementations of the first aspect.

According to a fifth aspect, an embodiment of this application provides a computer program product including instructions. When the computer program product runs on an MIPI switch or an electronic device, the MIPI switch or the electronic device is enabled to perform the switch switching method provided in the first aspect and with reference to any one of the implementations of the first aspect.

According to a sixth aspect, an embodiment of this application provides a chip, where the chip is applied to an electronic device. The chip includes one or more processors, and the processor is configured to invoke computer instructions to enable the electronic device to perform the switch switching method provided in the first aspect and with reference to any one of the implementations of the first aspect.

It may be understood that the MIPI switch provided in the second aspect, the electronic device provided in the third aspect, the computer storage medium provided in the fourth aspect, the computer program product provided in the fifth aspect, and the chip provided in the sixth aspect are all used to perform the method provided in embodiments of this application. Therefore, for beneficial effects that can be achieved the MIPI switch, the electronic device, the computer storage medium, the computer program product, and the chip, refer to beneficial effects in a corresponding method. Details are not described herein.

BRIEF DESCRIPTION OF DRAWINGS

FIG. 7 is a flowchart of a switch switching method according to an embodiment of this application;

DESCRIPTION OF EMBODIMENTS

Figures 1, 2:
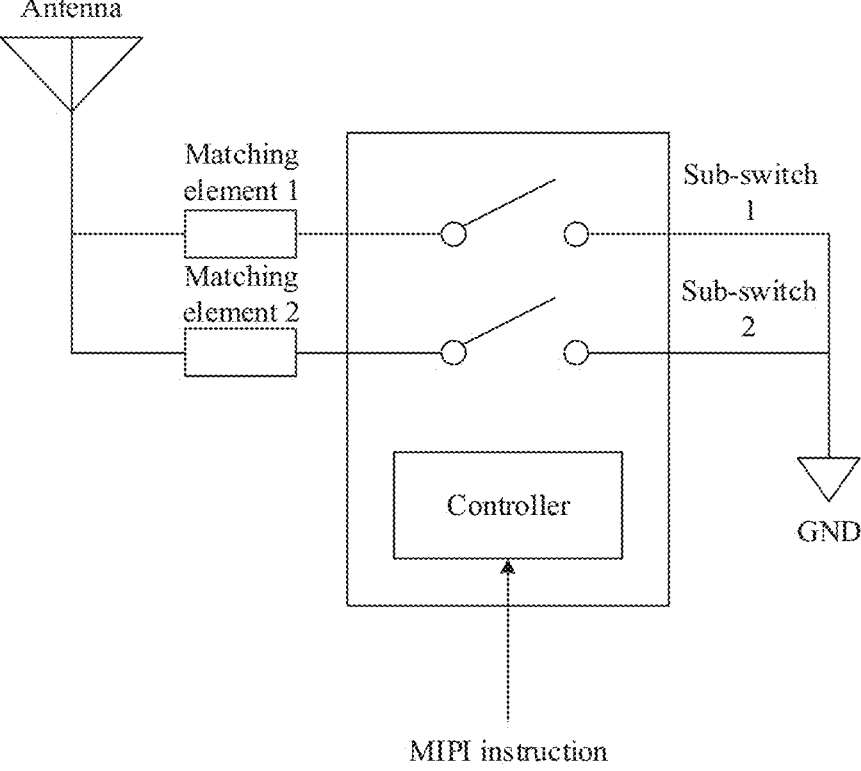
FIG. 1 is a schematic diagram of an MIPI switch according to an embodiment of this application.
FIG. 2 is a schematic diagram of an MIPI instruction according to an embodiment of this application.

The following clearly and completely describes technical solutions in embodiments of this application with reference to accompanying drawings in embodiments of this application. In the description of embodiments of this application, "/" means "or" unless otherwise specified. For example, "A/B" may represent A or B. In this specification, "and/or"

describes only an association relationship for describing associated objects and represents that three relationships may exist. For example, "A and/or B" may represent the following three cases: Only A exists, both A and B exist, and only B exists. In addition, in the description embodiments of this application, "a plurality of" means two or more than two.

It should be understood that the terms "first", "second", and the like in the description and claims of this application and in the accompanying drawings are used to distinguish between different objects, and are not used to describe a particular order. In addition, the terms "include", "have", and any variations thereof are intended to cover non-exclusive inclusions. For example, a process, method, system, product, or device that includes a list of steps or units is not limited to a listed step or unit, but optionally further includes an unlisted step or unit, or optionally further includes another step or unit inherent to the process, method, product, or device.

An "embodiment" in this application means that a specific feature, structure, or characteristic described with reference to the embodiment may be included in at least one embodiment of this application. The phrase appearing at various locations in the specification does not necessarily refer to a same embodiment, nor is a separate or alternative embodiment mutually exclusive with another embodiment. A person skilled in the art explicitly and implicitly understand that the embodiments described in this application may be combined with another embodiment.

First, some terms and related technologies used in this application are described for ease of understanding by a person skilled in the art.

MIPI (mobile industry processor interface) is an abbreviation for mobile industry processor interface. The MIPI (mobile industry processor interface) is an open standard initiated by the MIPI Alliance for mobile application processors.

GPIO (English: General-purpose input/output) is an abbreviation for general-purpose input/output, and has functions similar to a P0 port to a P3 port of an 8051. A pin of the GPIO may be freely used by a user by program controlling. The pin can be used as a general-purpose input (GPI), a general-purpose output (GPO), or a general-purpose input/output (GPIO) based on a practical consideration, for example, as a clock generator or a chip selector.

A pin, also known as a pin, is called pin in English, and is a connection between an internal circuit of an integrated circuit (chip) and a peripheral circuit. All pins form an interface of the chip. A segment at an end of a leading wire forms a solder joint with a pad on a printed board through soldering.

With continuous development of communication technologies, not only a quantity of antennas increases day by day, but also an antenna needs to support different operating frequencies. In this case, a switch needs to be used to switch different statuses, so that the antenna can support different operating frequencies, that is, the antenna can receive/send signals of different frequencies.

An MIPI switch is widely used currently, and can be used to help the antenna switch different operating frequencies. FIG. 1 is a schematic diagram of an MIPI switch according to an embodiment of this application. The MIPI switch includes a controller and a sub-switch. The controller translates an MIPI instruction into a control signal for each sub-switch. Turn-off and turn-on of the sub-switch are controlled by a level output by the controller. There may be one or more sub-switches. One terminal of each sub-switch port is grounded, and the other terminal thereof is connected to a matching element. When there is more than one sub-switch in the MIPI switch, matching elements connected to sub-switches in the MIPI switch are connected in parallel to an antenna. As shown in FIG. 1, one terminal of a sub-switch 1 is connected to the GND (ground), and the other terminal thereof is connected to a matching element 1; and one terminal of a sub-switch 2 is connected to the GND (ground), and the other terminal thereof is connected to a matching element 2. That is, the sub-switch 1 is connected in series to the matching element 1, the sub-switch 2 is connected in series to the matching element 2, and then the matching element 1 and the matching element 2 are connected in parallel to the antenna.

It may be understood that the MIPI switch may further include some other pins and components, which is not limited in this application.

Figure 3:
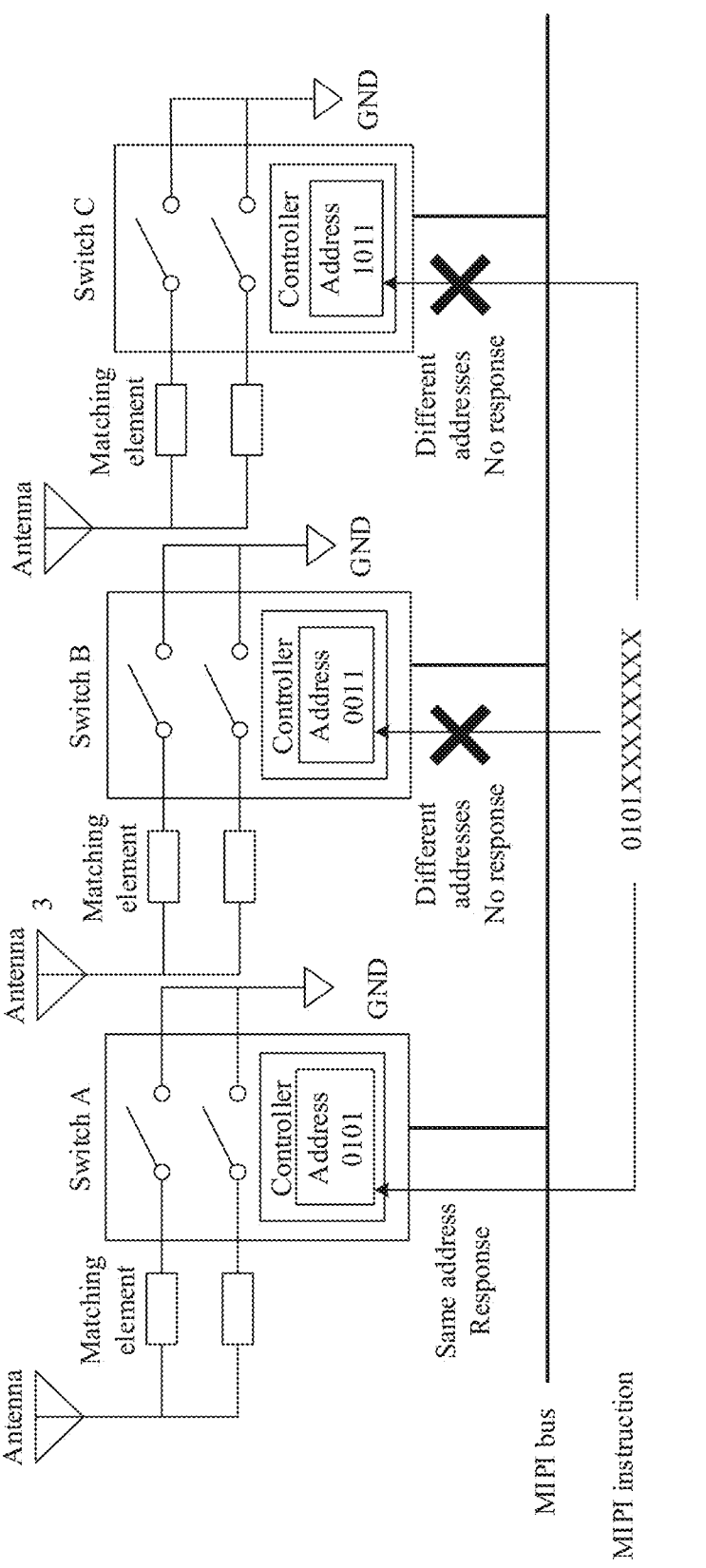
FIG. 3 is a schematic diagram of a principle for controlling a switch by an MIPI instruction according to an embodiment of this application.

The MIPI switch is controlled by an MIPI instruction. The MIPI instruction includes address bits and control instruction bits. There are a total of four address bits, which are used to indicate address information (an MIPI address) of the MIPI switch controlled by the MIPI instruction. There are a total of eight control instruction bits, and the eight control instruction bits are specifically used to control a status of the MIPI switch, that is, control turn-off and turn-on of the sub-switch in the MIPI switch. As shown in FIG. 2, bit 0 to bit 7 are used to indicate specific content of the MIPI instruction. It may be understood that each MIPI switch corresponds to one independent MIPI address, and an MIPI instruction is broadcast on an MIPI bus. Only an MIPI switch corresponding to an MIPI address in the MIPI instruction responds to the MIPI instruction. FIG. 3 is a schematic diagram of a principle for controlling a switch by an MIPI instruction according to an embodiment of this application. An MIPI instruction A is broadcast on a bus. Address bits in the instruction are 0101, and an MIPI address of a switch A is 0101. The address of the switch A is the same as the address indicated by the address bits in the MIPI instruction A. Therefore, the switch A responds to the MIPI instruction A. However, an address of a switch B is 0001, and an address of a switch C is 1011. The addresses of the two switches are different from the address indicated by the address bits in the MIPI instruction A. Therefore, the switches B and C do not respond to the MIPI instruction A.

Figure 4A:
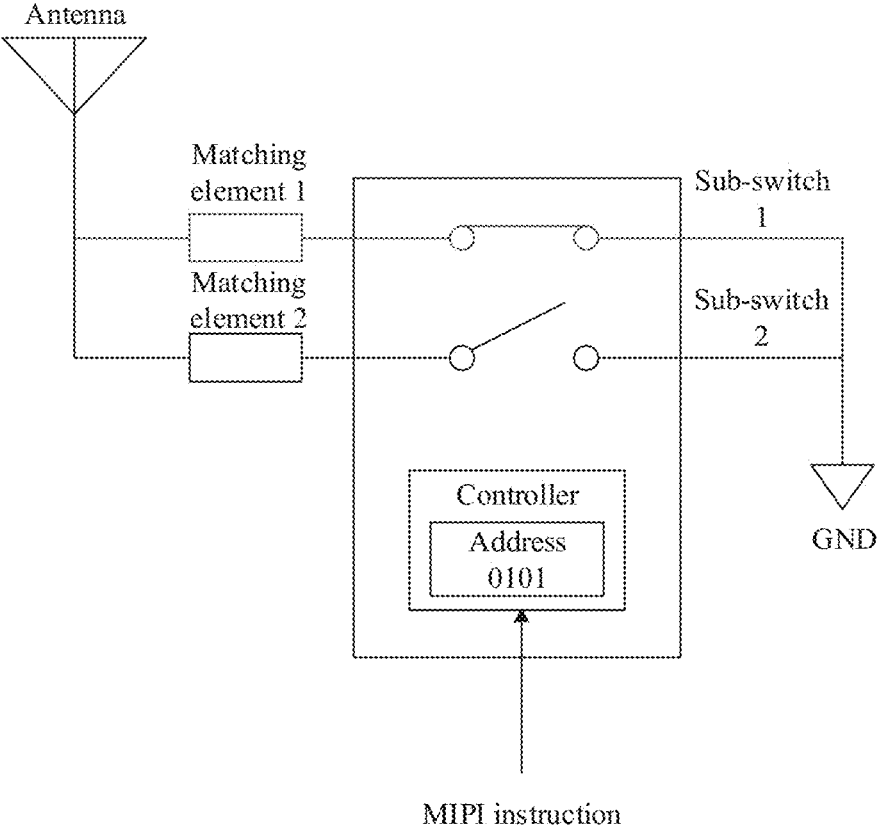
FIG. 4A is a schematic diagram of still another MIPI switch according to an embodiment of this application.
Figure 4B:
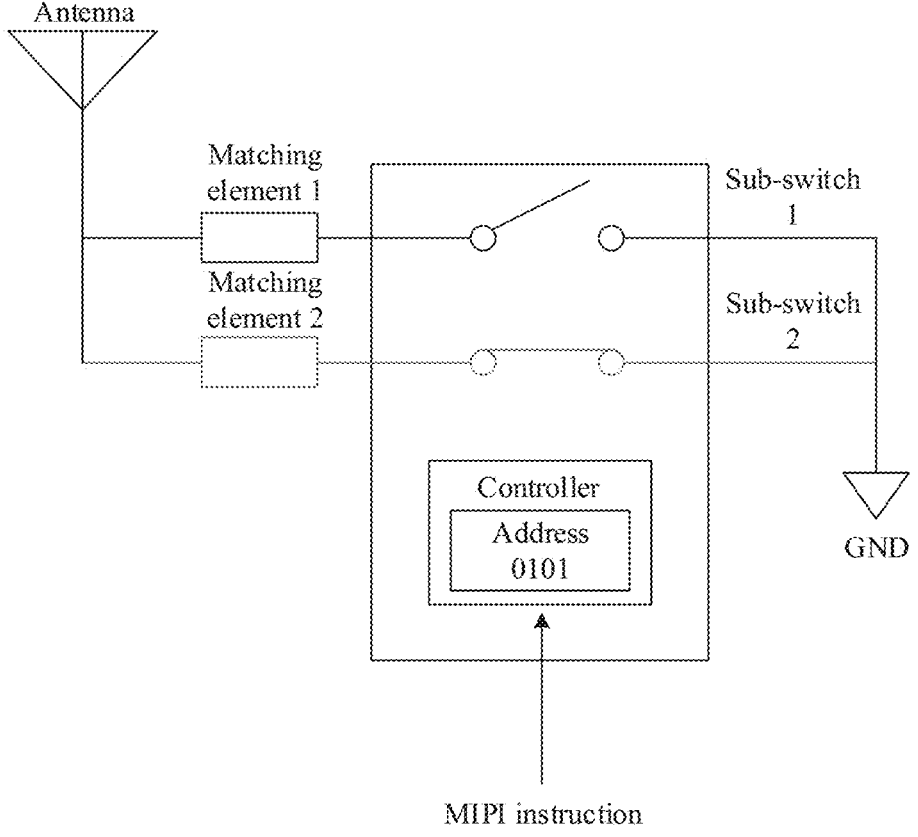
FIG. 4B is a schematic diagram of still another MIPI switch according to an embodiment of this application.

It should be noted that the MIPI instruction controls the MIPI switch, that is, controls turn-off and turn-on of the sub-switch in the MIPI switch. When the MIPI switch includes more than one sub-switch, the MIPI instruction usually controls turn-off and turn-on of only one sub-switch. Therefore, a case in which all the more than one sub-switch is turned on does not occur. For example, an MIPI switch in FIG. 4A and FIG. 4B includes two sub-switches. When an MIPI instruction controls the MIPI switch, as shown in FIG. 4A, a sub-switch 1 may be controlled to be turned on, and in this case, a sub-switch 2 is turned off; or as shown in FIG. 4B, the sub-switch 2 may be controlled to be turned on, and in this case, the sub-switch 1 is turned off.

Figure 5:
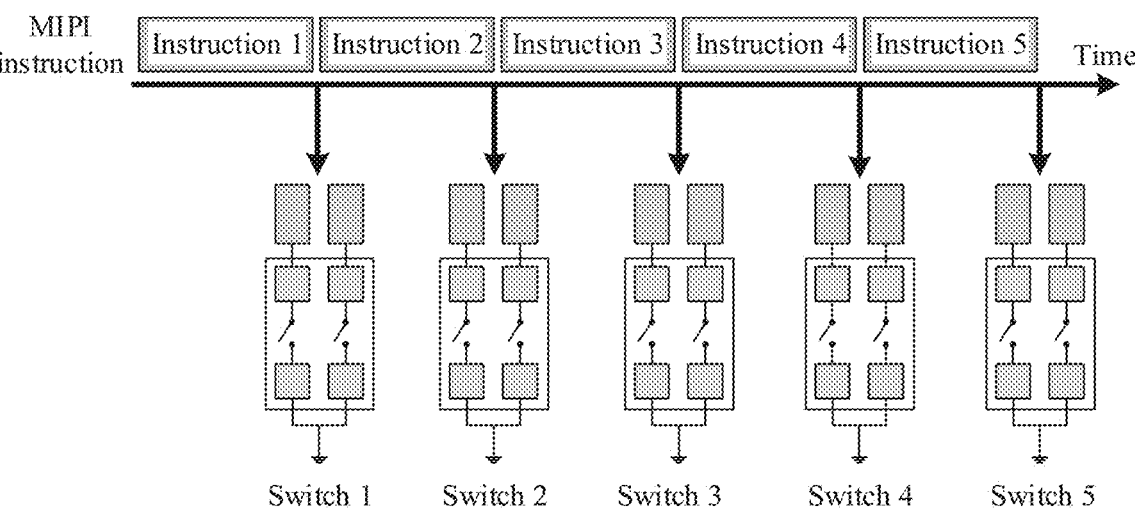
FIG. 5 is a schematic diagram of a switch switching method according to an embodiment of this application.

Currently, a plurality of MIPI switches may be connected to the MIPI bus, to support switching of different operating frequencies. Because an MIPI instruction can only control an MIPI switch corresponding to an MIPI address in the instruction, and MIPI instructions can only be sent in series on the MIPI bus, when statuses of the plurality of MIPI switches need to be switched to support a specific frequency, a plurality of MIPI instructions need to be sent in series when the statuses of the plurality of MIPI switches needs to be switched. As shown in FIG. 5, if statuses of five MIPI switches from a switch 1 to a switch 5 need to be switched, for example, from a turn-off state to a turn-on state, or from a turn-on state to a turn-off state, five MIPI instructions need to be sent. MIPI addresses in the five MIPI instructions respectively correspond to MIPI addresses of the five MIPI switches. Because the MIPI instructions are sent in series on the MIPI bus (a next instruction can be sent only after one instruction has been sent), the five MIPI switches cannot respond simultaneously. It may be understood that in the foregoing switch switching method, a response time of the switch is long, which results in an excessively high latency of an entire switch switching process. Consequently, the switch cannot be switched in a timely manner to support different operating frequencies.

In addition, a platform also has a limitation on a quantity of MIPI switches. For example, a modem (communication baseband chip) has a requirement on a total latency of antenna switching, and consequently, the quantity of MIPI switches is limited.

Based on the foregoing content, this application provides a switch switching method and a related apparatus, so that the plurality of MIPI switches share one address, that is, one MIPI instruction controls the plurality of MIPI switches. This overcomes the limitation of the platform on the quantity of MIPI switches, and reduces a response time of the switch, that is, reduces a switching latency of the switch.

The following first describes a system architecture used in an embodiment of this application.

Figure 6:
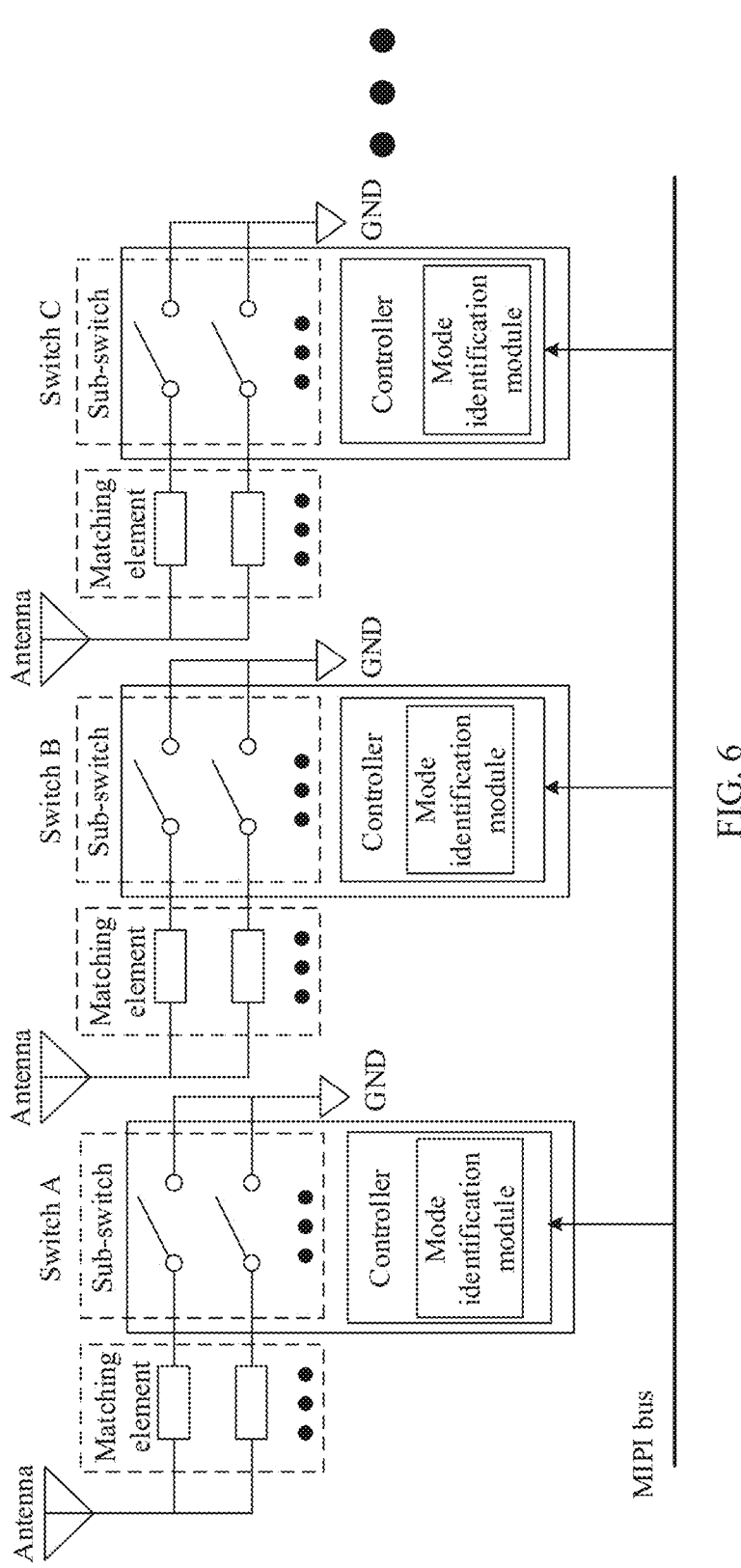
FIG. 6 is a schematic diagram of a switch switching system according to an embodiment of this application.

FIG. 6 is a schematic diagram of a switch switching system according to an embodiment of this application. The switch switching system includes at least one MIPI switch, an MIPI bus, a matching element, and an antenna. The MIPI switch includes a controller and at least one sub-switch. The controller of the MIPI switch is connected to the MIPI bus. One terminal of the sub-switch of the MIPI switch is connected to the matching element in series and then connected to the antenna, and the other terminal thereof is grounded. It should be noted that when one MIPI switch includes a plurality of sub-switches, the sub-switches are connected in parallel.

It may be understood that when the switch switching system includes more than one MIPI switch, two or more MIPI switches may share one address, so that one MIPI instruction controls a plurality of switches. To enable these different MIPI switches with a same address to be independently switched, that is, turn-off and turn-on of different MIPI switches with a same address do not affect each other, control instruction bits (as shown in FIG. 2, eight bits in total) in an MIPI instruction may be divided.

In addition, the MIPI switch may include a controller and a first pin, and there is a connection relationship between the controller and the first pin. It may be understood that the first pin may include but is not limited to a mode pin. The following descriptions are described by using the mode pin as an example.

It may be understood that there is a connection relationship between the controller and the mode pin. Different statuses of the mode pin may be in a one-to-one correspondence with divided control instruction bits, so that when reading an MIPI instruction, the MIPI switch can identify, based on different statuses of the mode pin, control instruction bits corresponding to the MIPI switch in this case.

After the MIPI bus broadcasts the MIPI instruction, the controller inside the MIPI switch parses the MIPI instruction, and determines whether an address in the MIPI instruction is the same as an address of the MIPI switch. If the addresses are different, the MIPI switch does not respond to the MIPI instruction. If the addresses are the same, the controller continues to parse a control instruction of the MIPI instruction, identifies a status of the mode pin, determines which control instruction bits are specifically used to control the MIPI switch, and then translates the control instruction bits into a component status, to implement switching.

The following describes a specific implementation of this application with reference to a flowchart shown in FIG. 7.

S701. Receive an MIPI instruction, where the MIPI instruction includes an MIPI address and a control instruction.

Specifically, when there is a need to switch to different operating frequencies, a master control component or a platform delivers a corresponding MIPI instruction, then, an MIPI bus broadcasts the MIPI instruction, and an MIPI switch receives the MIPI instruction. It may be understood that the MIPI switch includes a first pin, and the first pin may include but is not limited to a mode pin (in the following, the mode pin is used as an example for description). In addition, the MIPI instruction may include an MIPI address and a control instruction.

In an embodiment of this application, a controller in the MIPI switch receives the MIPI instruction.

Figure 8:
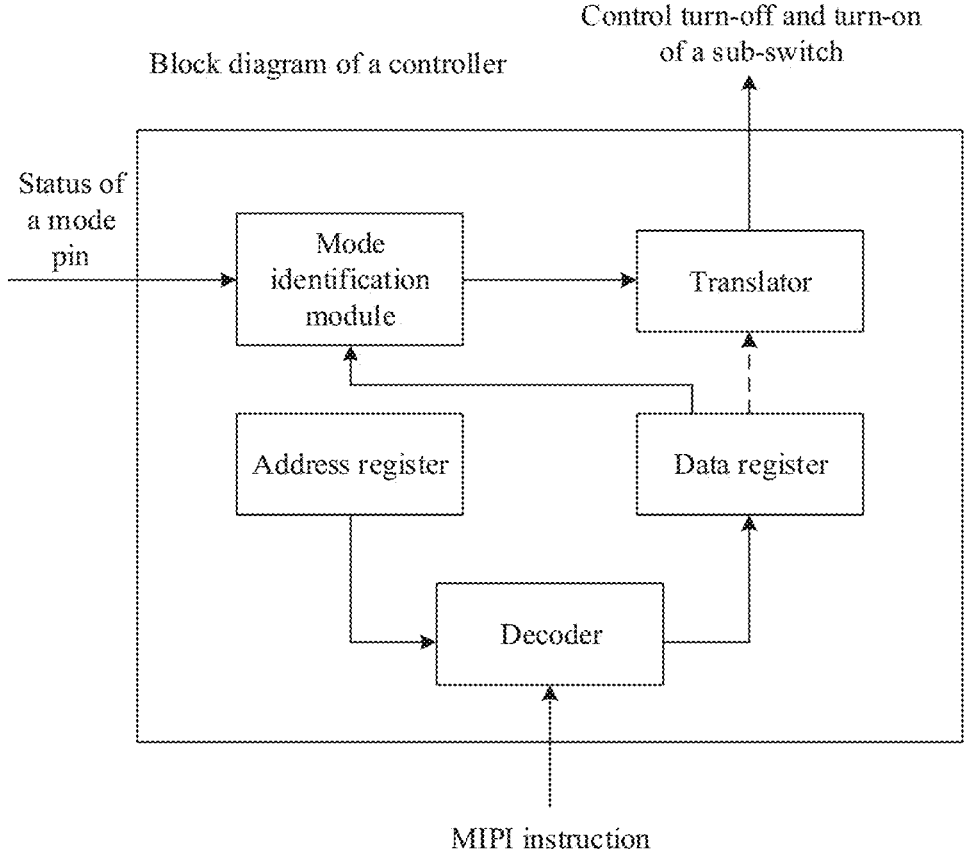
FIG. 8 is a schematic diagram of a structure principle of a controller according to an embodiment of this application.

FIG. 8 is a schematic diagram of a structure principle of a controller according to an embodiment of this application. The controller includes a decoder, an address register, a data register, a mode identification module, and a translator. The decoder is configured to parse the MIPI instruction to obtain the MIPI address and the control instruction in the MIPI instruction. The address register is configured to store an address of a memory unit accessed by a current CPU; and in an embodiment of this application, the address register is configured to store an MIPI address in a currently received MIPI instruction. The data register is configured to temporarily store to-be-transmitted data between a microprocessor and a memory or an input/output interface circuit; and in an embodiment of this application, the data register is configured to temporarily store the control instruction in the MIPI instruction. The mode identification module is configured to identify a current status of the mode pin. The translator is configured to translate the control instruction in the MIPI instruction into a component status for displaying.

S702. Preliminarily parse the MIPI instruction.

Specifically, the MIPI switch preliminarily parses the MIPI instruction, to obtain the MIPI address and an X-bit control instruction. The MIPI address is used to indicate an address of an MIPI switch controlled by the MIPI instruction, and the control instruction is used to control turn-off and turn-on of each sub-switch in the MIPI switch.

In an embodiment of this application, the controller in the MIPI switch preliminarily parses the MIPI instruction. Specifically, the decoder in the controller preliminarily parses the MIPI instruction to obtain a 4-bit MIPI address and an 8-bit control instruction.

S703. Determine whether the MIPI address in the MIPI instruction is the same as an MIPI address of the MIPI switch.

Specifically, the MIPI switch determines whether the MIPI address (that is, the MIPI address obtained through preliminary parsing) in the MIPI instruction is the same as the MIPI address of the MIPI switch. If the addresses are different, the MIPI instruction cannot control the MIPI switch, that is, the MIPI switch does not respond to the MIPI instruction; or if the addresses are the same, the MIPI switch writes the control instruction into the data register.

In an embodiment of this application, the data register includes a total of eight data bits from D0 to D7, which are configured to store the 8-bit (bit 0 to bit 7) control instruction written to the MIPI switch.

S704. Determine that an MIPI instruction responds to a Y-bit instruction in the control instruction.

Specifically, after determining that an MIPI address in a received MIPI instruction is the same as the MIPI address of the MIPI switch, the MIPI switch further needs to determine which part of the control instruction is to be responded by the MIPI switch, that is, determine which control instruction bit or bits controls or control the MIPI switch.

It may be understood that a status of the mode pin may be identified by using the mode identification module, to determine which control instruction bit or bits controls or control the MIPI switch. That is, when it is determined that the MIPI instruction is used to control the MIPI switch (the address in the MIPI instruction is the same as the address of the MIPI switch), the MIPI switch may determine the Y-bit instruction in the control instruction based on the status of the mode pin. The Y-bit instruction is an instruction used to switch the MIPI switch.

Figure 9:
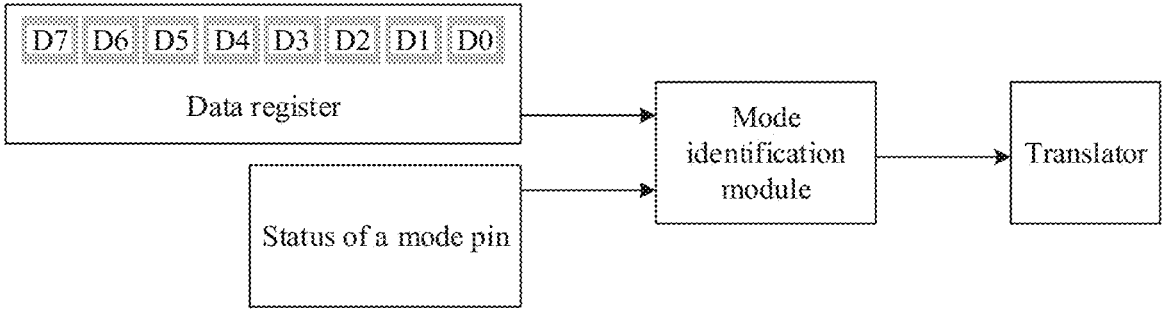
FIG. 9 is a schematic diagram of a principle of a mode identification module according to an embodiment of this application.

It should be noted that, as shown in FIG. 8, the mode identification module has two inputs: 1. the control instruction input by the data register; and 2. the status of the mode pin. Specifically, refer to FIG. 9. FIG. 9 is a schematic diagram of a principle of a mode identification module according to an embodiment of this application. The data register writes the control instruction (bit 0 to bit 7) that is obtained by the decoder through preliminary parsing into the data bits (D0 to D7) of the data register, and transmits the control instruction to the mode identification module. The mode pin transmits the status of the mode pin to the mode identification module. The mode identification module determines, based on the status of the mode pin, which control instruction bits control the MIPI switch, and further determines which part of the control instruction is specifically used to control the MIPI switch. That is, there are mapping relationships between different statuses of the mode pin and different control instruction bits.

Specifically, it may be learned from the foregoing that the control instruction has eight bits. The eight control instruction bits are divided, and M combinations may be obtained after each division. The combination herein refers to a combination of different control instruction bits. Thus, it may be understood that the eight control instruction bits are divided into M parts. A quantity of control instruction bits included in each part is not necessarily the same. The control instruction bits included in each part are not necessarily adjacent. For example, the eight control instruction bits are divided, and three combinations (that is, M=3) are obtained. The three combinations are: (1) bit 0 and bit 2; (2) bit 1, bit 3, and bit 4; and (3) bit 5 to bit 7. Further, the mode pin may have N statuses. The N statuses may be one or more statuses, such as being connected to a high level, having a load and being connected to a high level, being connected to a low level, having a load and being connected to a low level, and an open circuit. Each status of the mode pin corresponds to one combination obtained by dividing the control instruction bits. It may be understood that each combination obtained after the control instruction bits are divided does not necessarily correspond to a status of the mode pin. A quantity of statuses that may be implemented by the mode pin does not exceed a quantity of combinations obtained after the control instruction bits are divided. That is, a relationship between M and N is M≥N.

Figure 10:
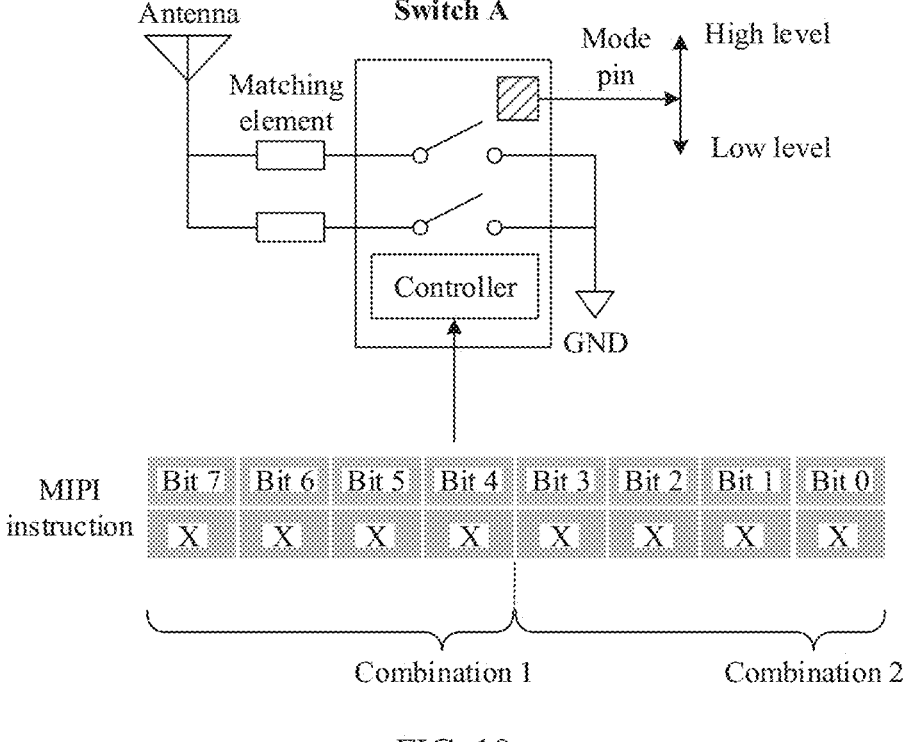
FIG. 10 is a schematic diagram of a principle for controlling a switch by still another MIPI instruction according to an embodiment of this application.

In an embodiment of this application, the mode pin has two statuses: 1. The mode pin is connected to a high level; and 2. The mode pin is connected to a low level. That is, N=2. Because M≥N, M≥2. The control instruction bits may be divided to obtain at least two combinations. As shown in FIG. 10, the control instruction bits are divided to obtain two combinations: a combination 1 and a combination 2. When the mode pin of the MIPI switch is connected to a high level, the MIPI switch responds to the control instruction bits included in the combination 1; or when the mode pin of the MIPI switch is connected to a low level, the MIPI switch responds to the control instruction bits included in the combination 2. It may be understood that both a quantity of control instruction bits included in the combination 1 and a quantity of control instruction bits included in the combination 2 may be changed. However, because the control instruction has eight bits, a sum of quantities of control instruction bits included in the combination 1 and the combination 2 does not exceed eight bits (bit 0 to bit 7). That is, Y is not a fixed value, but Y≤8. For example, A includes four bits (bit 4 to bit 7), and B includes four bits (bit 0 to bit 3); A includes two bits (bit 6 to bit 7), and B includes six bits (bit 0 to bit 5); or A includes three bits (bit 5 to bit 7), and B includes three bits (bit 0 to bit 2).

Figure 11:
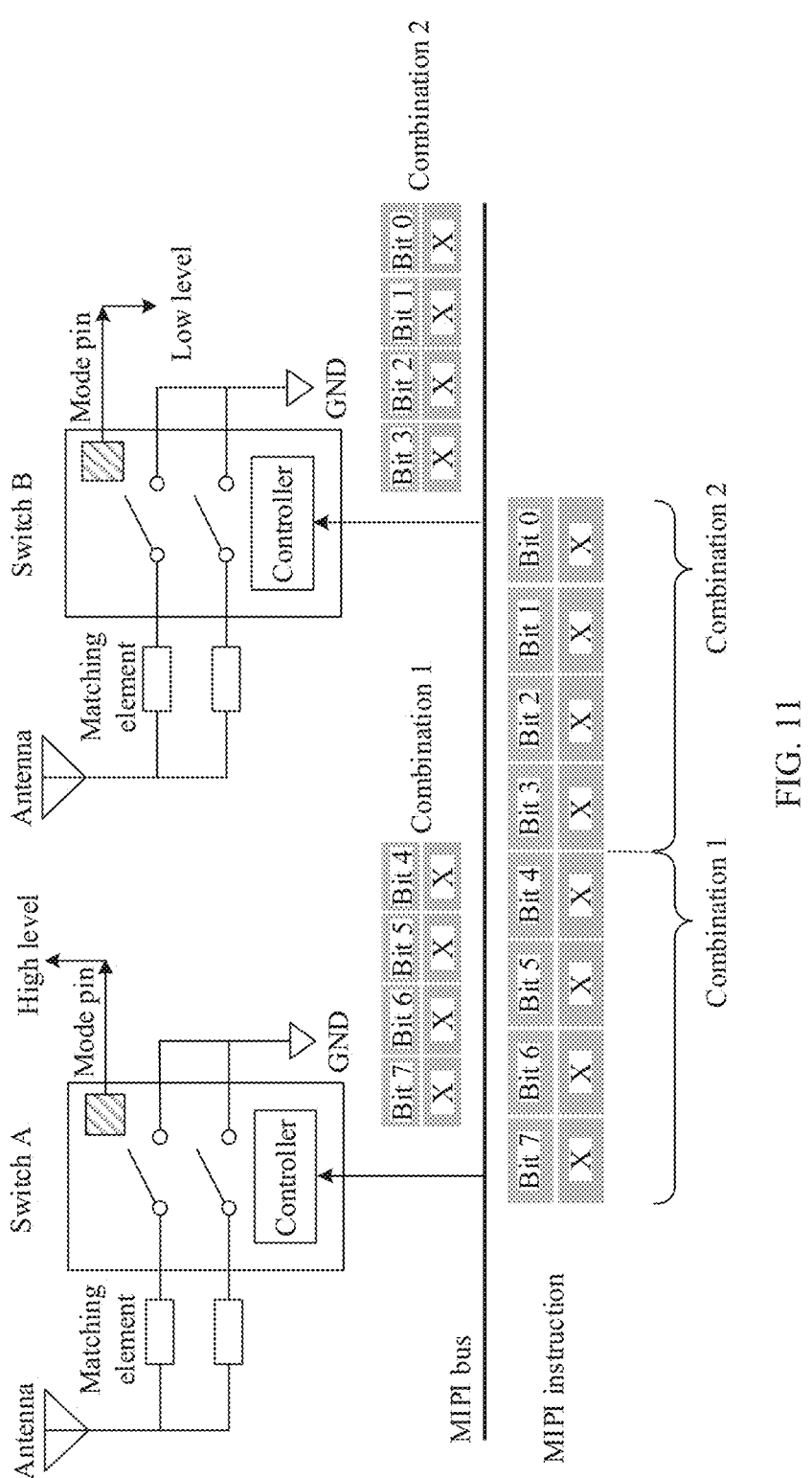
FIG. 11 is a schematic diagram of a principle for controlling a switch by still another MIPI instruction according to an embodiment of this application.

It may be learned from the foregoing content that when the mode pin has two statuses, one MIPI instruction may control two MIPI switches. As shown in FIG. 11, a mode pin of a switch A is connected to a high level, and a mode pin of a switch B is connected to a low level. If MIPI addresses of the switch A and the switch B are the same as an address in the MIPI instruction shown in the figure, the MIPI instruction may simultaneously control both the switch A and the switch B. Specifically, the switch A responds to a combination 1 in the MIPI instruction, and the switch B responds to a combination 2 in the MIPI instruction.

It may be understood that an implementation in which the mode pin is connected to a high level includes that the mode pin is connected to a power supply, and an implementation in which the mode pin is connected to a low level includes that the mode pin is grounded. Certainly, there are many other implementations in which the mode pin is connected to the high/low level. This is not limited in this application.

Figure 12:
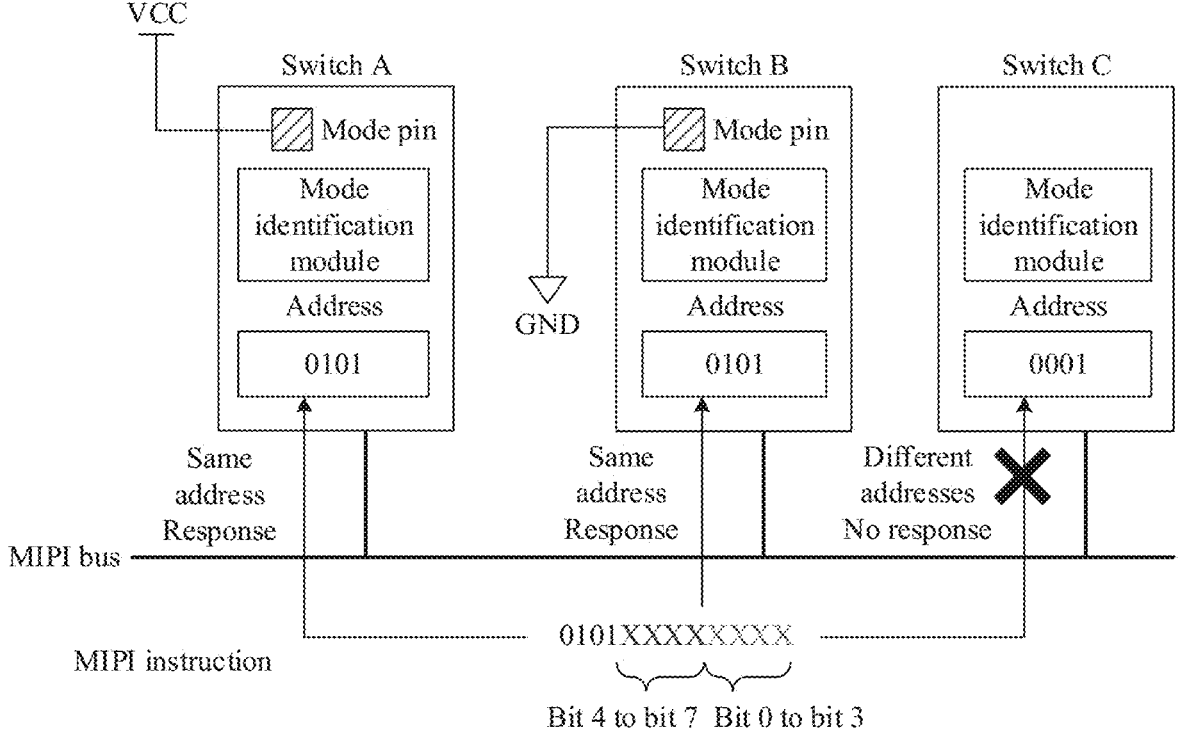
FIG. 12 is a schematic diagram of a principle for controlling a switch by still another MIPI instruction according to an embodiment of this application.

For example, when the mode pin of the MIPI switch is connected to a high level, the MIPI switch responds to the most significant four bits (bit 4 to bit 7) in the control instruction bits; or when the mode pin of the MIPI switch is connected to a low level, the MIPI switch responds to the least significant four bits (bit 0 to bit 3) in the control instruction bits. FIG. 12 is a schematic diagram of a principle for controlling a switch by still another MIPI instruction according to an embodiment of this application. An MIPI bus broadcasts the MIPI instruction. An MIPI address included in the MIPI instruction is a 0101. After receiving the MIPI instruction, each of a switch A, a switch B, and a switch C determines whether the address of the MIPI instruction is the same as its own MIPI address. The MIPI address of the switch A is 0101, the MIPI address of the switch B is 0101, and the MIPI address of the switch C is 0001. Therefore, the MIPI addresses of the switch A and the switch B are the same as the address of the MIPI instruction, the switch A and the switch B respond to the MIPI instruction, but the MIPI address of the switch C is different from the address of the MIPI instruction, and the switch C does not respond to the MIPI instruction. After the switch A and the switch B perform address check, mode identification modules inside the switch A and the switch B identify statuses of mode pins. The mode pin of the switch A is connected to a power supply. Therefore, the mode pin of the switch A is connected to a high level, and the switch A responds to a combination 1 in the control instruction bits, that is, responds to (bit 4 to bit 7) in the control instruction bits. The mode pin of switch B is grounded. Therefore, the mode pin of switch B is connected to a low level, and the switch B responds to a combination 2 in the control instruction bits, that is, responds to the least significant four bits (bit 0 to bit 3) in the control instruction bits. It may be understood that in the foregoing example, Y=4.

Figure 13:
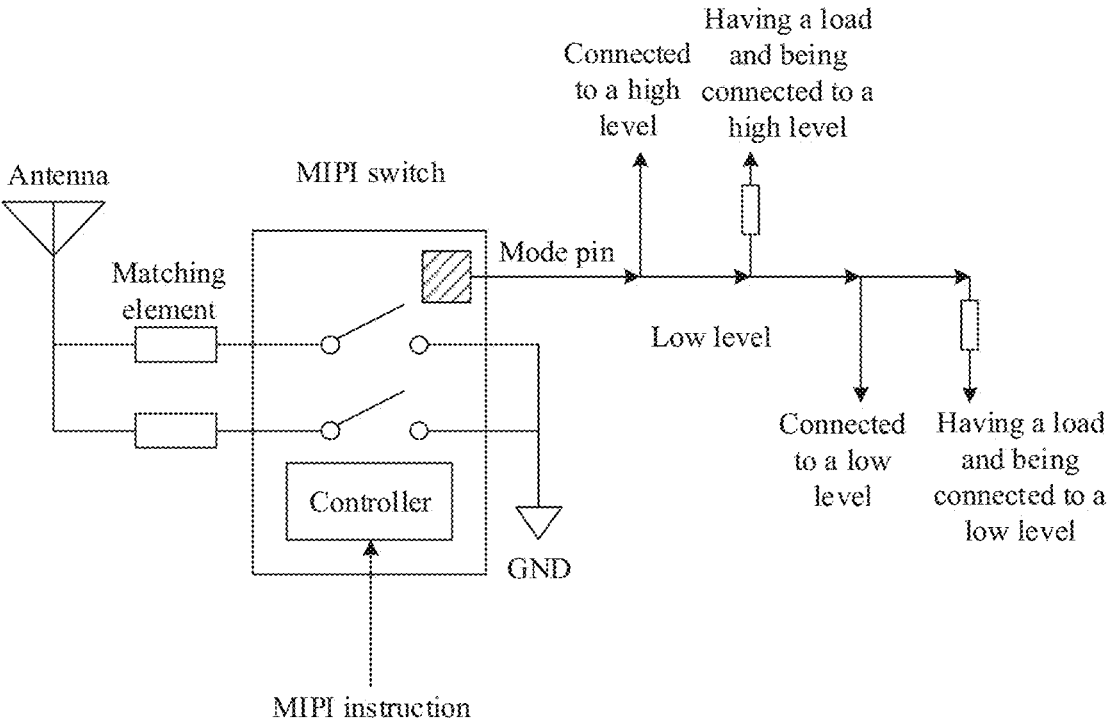
FIG. 13 is a schematic diagram of a status of a mode pin according to an embodiment of this application.

In still another embodiment of this application, as shown in FIG. 13, a mode pin has four statuses: 1. The mode pin is connected to a high level; 2. The mode pin has a load and is connected to a high level; 3. The mode pin is connected to a low level; and 4. The mode pin has a load and is connected to a low level. That is, N=4.

Figure 14:
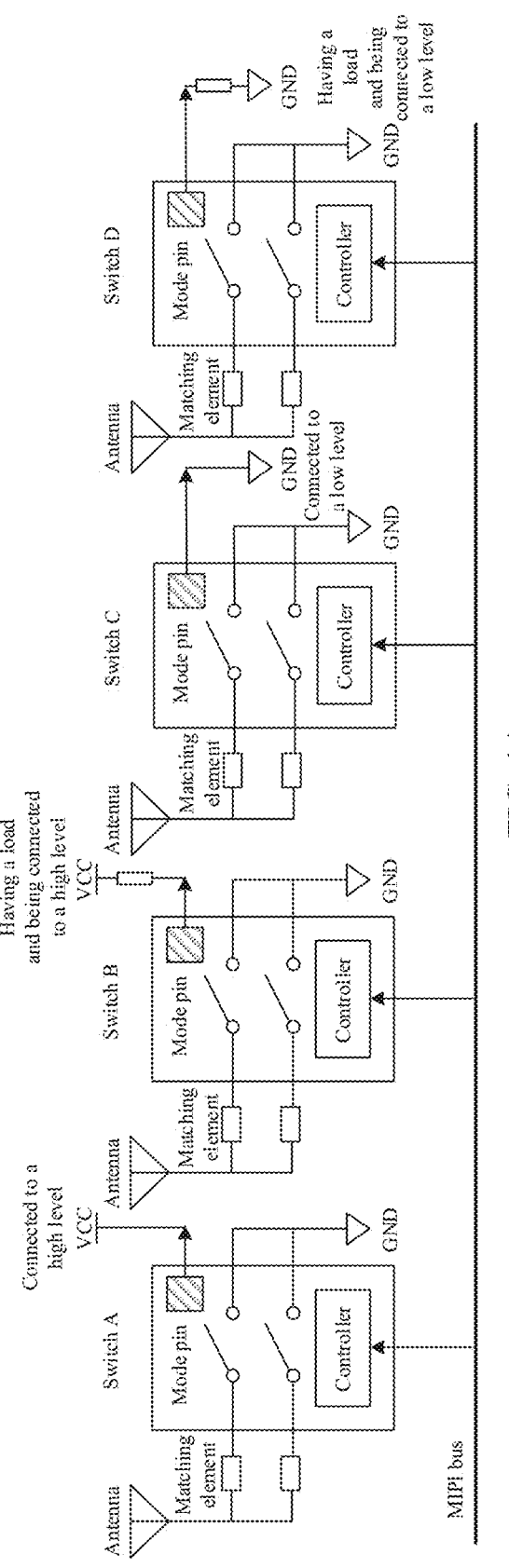
FIG. 14 is a schematic diagram of a connection of an MIPI switch according to an embodiment of this application.

It can be learned from the foregoing content that when the mode pin has four statuses, one MIPI instruction can control up to four MIPI switches. As shown in FIG. 14, a mode pin of a switch A is connected to a high level, a mode pin of a switch B has a load and is connected to a high level, a mode pin of a switch C is connected to a low level, and a mode pin of a switch D has a load and is connected to a low level. If MIPI addresses of the switch A, the switch B, the switch C, and the switch D are the same as an address of an MIPI instruction, the MIPI instruction can simultaneously control all the switch A, the switch B, the switch C, and the switch D.

It may be understood that an implementation in which the mode pin is connected to a high level includes that the mode pin is connected to a power supply, an implementation in which the mode pin with the load is connected to a high level includes that the mode pin is connected to the power supply after being connected to a resistor and another component, an implementation in which the mode pin is connected to a low level includes that the mode pin is grounded, and an implementation in which the mode pin with the load is connected to a low level includes that the mode pin is grounded after being connected to a resistor and another component. Certainly, there are many other implementations in which the mode pin is connected to the high/low level. This is not limited in this application.

It should be noted that the mapping relationship between different statuses of the mode pin and combinations of the control instruction bits described above refers to logic of the mode identification module, that is, first control logic. It may also be understood that the logic (the first control logic) of the mode identification module includes correspondences between the N statuses of the mode pin and Y-bit instructions.

It may be understood that the logic of the mode identification module may be defined by using a truth table. The logic of the mode identification module is described based on the foregoing examples with reference to Table 1.

TABLE 1

| Serial number | Mode pin | Data register | | | | | | | | Output signal | | | | Specific meaning |
|---|---|---|---|---|---|---|---|---|---|---|---|---|---|---|
| 1 | 0 | D7 | D6 | D5 | D4 | D3 | D2 | D1 | D0 | D3 | D2 | D1 | D0 | Output the least significant four bits of the data register |
| 2 | 1 | D7 | D6 | D5 | D4 | D3 | D2 | D1 | D0 | D7 | D6 | D5 | D4 | Output the most significant four bits of the data register |

That the mode pin is connected to a high level is defined as "1". That the mode pin is connected to a low level is defined as "0". The eight data bits (D0 to D7) in the data register store the 8-bit (bit 0 to bit 7) control instruction. The output signal refers to a data bit output by the mode identification module to the translator.

According to Table 1, when the mode pin is connected to a high level, the mode identification module outputs the most significant four bits (D4 to D7) in the data bits (D0 to D7) of the data register to the translator; or when the mode pin is connected to a low level, the mode identification module outputs the least significant four bits (D0 to D3) in the data bits (D0 to D7) of the data register to the translator.

It may be understood that a Z-bit instruction in the X-bit control instruction can be used to control another switch (for example, a GPIO switch). For example, when a quantity of combinations obtained by dividing the 8-bit control instruction is more than the status of the mode pin, that is, when the relationship between M and N is M>N, the Z-bit instruction in the 8-bit control instruction can be used to control the GPIO switch. It may be understood that Z≤8.

Figure 15:
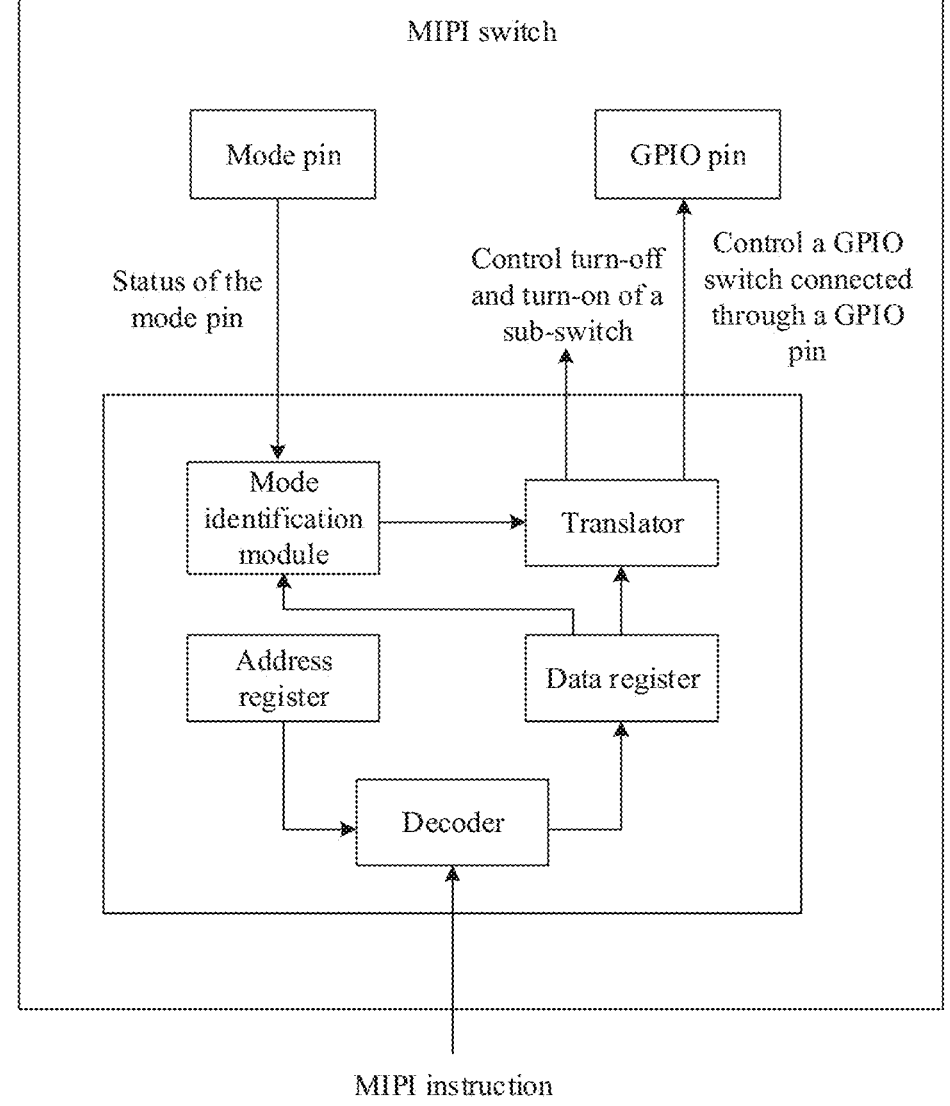
FIG. 15 is a schematic diagram of an MIPI switch according to an embodiment of this application.

FIG. 15 is a schematic diagram of an MIPI switch according to an embodiment of this application. After receiving an MIPI instruction broadcast by an MIPI bus, the MIPI switch preliminarily parses the MIPI instruction by using a decoder, to obtain a 4-bit MIPI address and an 8-bit control instruction. The MIPI switch compares whether the MIPI address in the address register is the same as the MIPI address obtained by the decoder through parsing. If the MIPI addresses are the same, the 8-bit control instruction is written into the data register. The data register then separately transmits the control instruction to the mode identification module and the translator. The mode identification module determines, based on a status of the mode pin, which control instruction bits control the MIPI switch, transmits the control instruction bits to the translator, and then the translator specifically controls, based on second control logic, turn-off and turn-on of the sub-switch of the MIPI switch. In addition, the translator further specifically controls turn-off and turn-on of the GPIO switch based on the second control logic. Specifically, the translator determines which control instruction bits control the GPIO switch, and transmits different levels to corresponding GPIO pins based on the second control logic.

Figure 16:
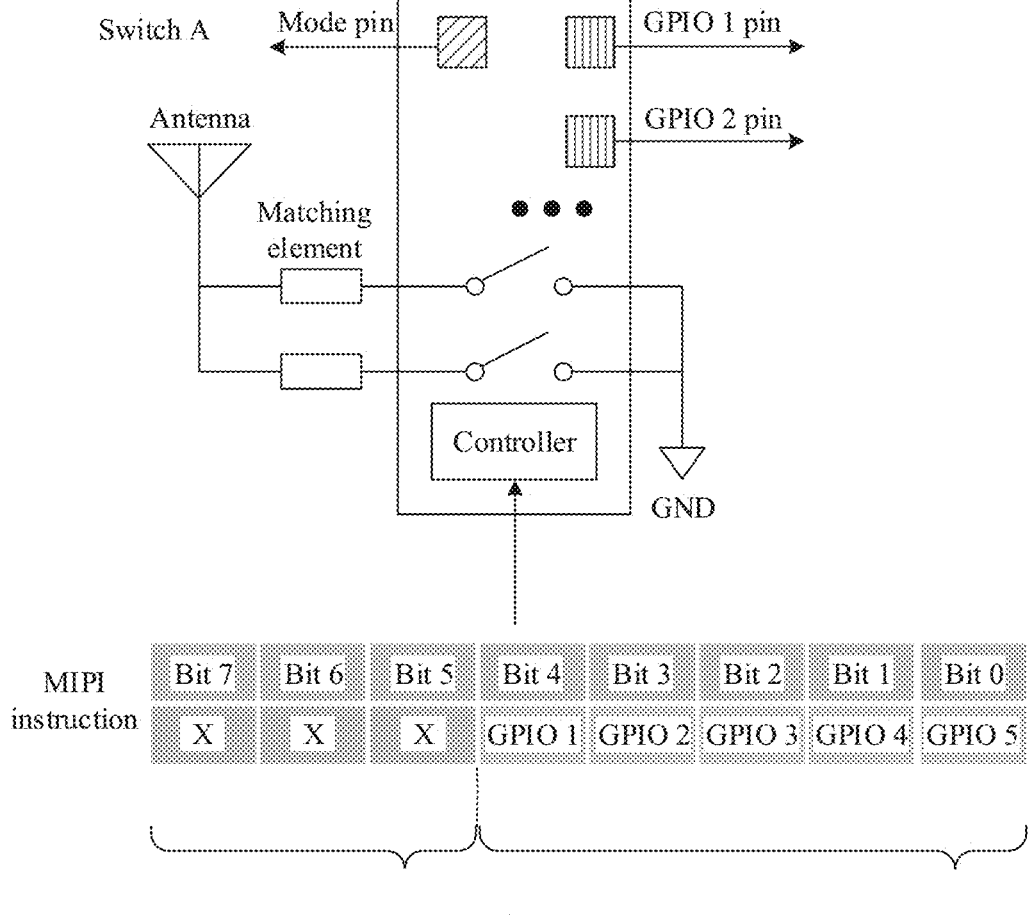
FIG. 16 is a schematic diagram of a principle for controlling a switch by still another MIPI instruction according to an embodiment of this application.

As shown in FIG. 16, in an embodiment of this application, the most significant three bits (bit 5 to bit 7) of the control instruction are set to control MIPI switches with a same MIPI address. The other bits (bit 0 to bit 4) are GPIO control bits, and specifically control outputs of GPIO pins (a GPIO 1 to a GPIO 5) of MIPI switches with a same MIPI address. It may be understood that the GPIO pin of the MIPI switch may be connected to a GPIO switch. When the GPIO pin of the MIPI switch is connected to the GPIO switch, an output signal of the GPIO of the MIPI switch is an input signal of the GPIO switch connected to the MIPI switch. In this case, the MIPI instruction may control not only the MIPI switch with a same address, but also the GPIO switch connected to the MIPI switch.

Figure 17:
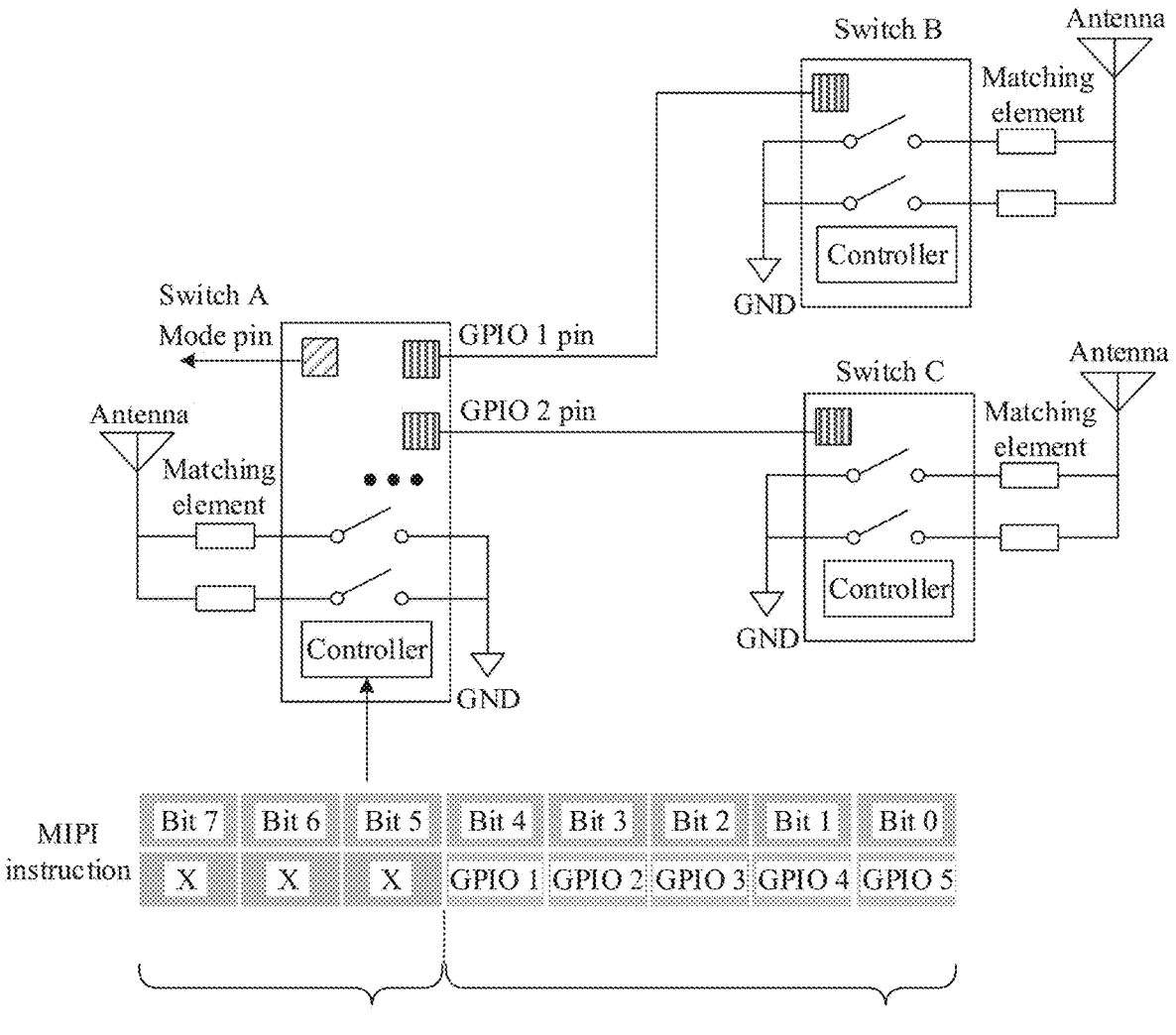
FIG. 17 is a schematic diagram of a connection of still another MIPI switch according to an embodiment of this application.

For example, refer to FIG. 17. FIG. 17 is a schematic diagram of a connection of still another MIPI switch according to an embodiment of this application. A switch A is an MIPI switch, and a switch B and a switch C are GPIO switches. The switch A includes two GPIO pins of a GPIO_1 and a GPIO_2. The switch A is connected to the switch B through the GPIO_1, and is connected to the switch C through the GPIO_2. After receiving an MIPI instruction and determining that an MIPI address in the MIPI instruction is the same as an MIPI address of the switch A, the switch A writes a control instruction (bit 0 to bit 7) in the MIPI instruction to the data register. Then, the data register separately transmits a written control instruction (D0 to D7) to the mode identification module and the translator. The mode identification module determines which control instruction bits control the switch A. The translator translates an instruction corresponding to a GPIO control bit in the MIPI instruction into an external output level based on control logic, and controls a connected GPIO switch by using the level. If the control logic of the MIPI instruction shown in FIG. 15 is used, the translator controls a sub-switch of the switch A based on the most significant three bits (bit 5 to bit 7) of the control instruction, that is, the most significant three data bits (D5 to D7) of the data register, transmits the fifth bit (bit 4) of the control instruction to the switch B through the GPIO_1, and transmits the fourth bit (bit 3) of the control instruction to the switch C through the GPIO_2.

It may be understood that logic (that is, second control logic) for controlling the GPIO switch by the control instruction may be defined by using a truth table. The second control logic is described by using an example in which bit 0 to bit 4 are GPIO control bits, as shown in Table 2:

TABLE 2

| | Input | | | | | | | | Output | | | | | Specific meaning Output the least |
|---|---|---|---|---|---|---|---|---|---|---|---|---|---|---|
| D7 | D6 | D5 | D4 | D3 | D2 | D1 | D0 | D4 | D3 | D2 | D1 | D0 | significant five bits | |
| X | Y | Z | 1 | 0 | 0 | 0 | 0 | 1 | 0 | 0 | 0 | 0 | Connect a GPIO 1 to a high level | |
| X | Y | Z | 0 | 1 | 0 | 0 | 0 | 0 | 1 | 0 | 0 | 0 | Connect a GPIO 2 to a high level | |
| X | Y | Z | 0 | 0 | 1 | 0 | 0 | 0 | 0 | 1 | 0 | 0 | Connect a GPIO 3 to a high level | |
| X | Y | Z | 0 | 0 | 0 | 1 | 0 | 0 | 0 | 0 | 1 | 0 | Connect a GPIO 4 to a high level | |
| X | Y | Z | 0 | 0 | 0 | 0 | 1 | 0 | 0 | 0 | 0 | 1 | Connect a GPIO 5 to a high level | |
| X | Y | Z | 1 | 1 | 0 | 0 | 0 | 1 | 1 | 0 | 0 | 0 | Connect the GPIO 1 and the GPIO 2 to high levels | |
| | | | . . . | | | | | | | . . . | | | . . . | |

As shown in Table 2, regardless of what D5 to D7 instructions are, only D0 to D4 (bit 0 to bit 4) finally control switching of the GPIO switch. That is, bit 0 to bit 4 are the GPIO control bits, and separately control the GPIO switch connected through the GPIO pins 1 to 5. It may be understood that the logic (that is, the second control logic) for controlling the GPIO switch by using the control instruction may be implemented by the translator (as shown in FIG. 17), or may be implemented by the data register. If the logic for controlling the GPIO switch by using the control instruction is implemented by the data register, the data register does not need to transmit the control instruction to the translator, but directly transmits the control instruction of the GPIO switch to the GPIO pin.

It should be noted that the GPIO switch is switched based on a level transmitted by the GPIO pin. For example, when the GPIO pin of the GPIO switch inputs a high level, the GPIO switch is turned on; or when the GPIO pin of the GPIO switch inputs a low level, the GPIO switch is turned off.

Figure 18:
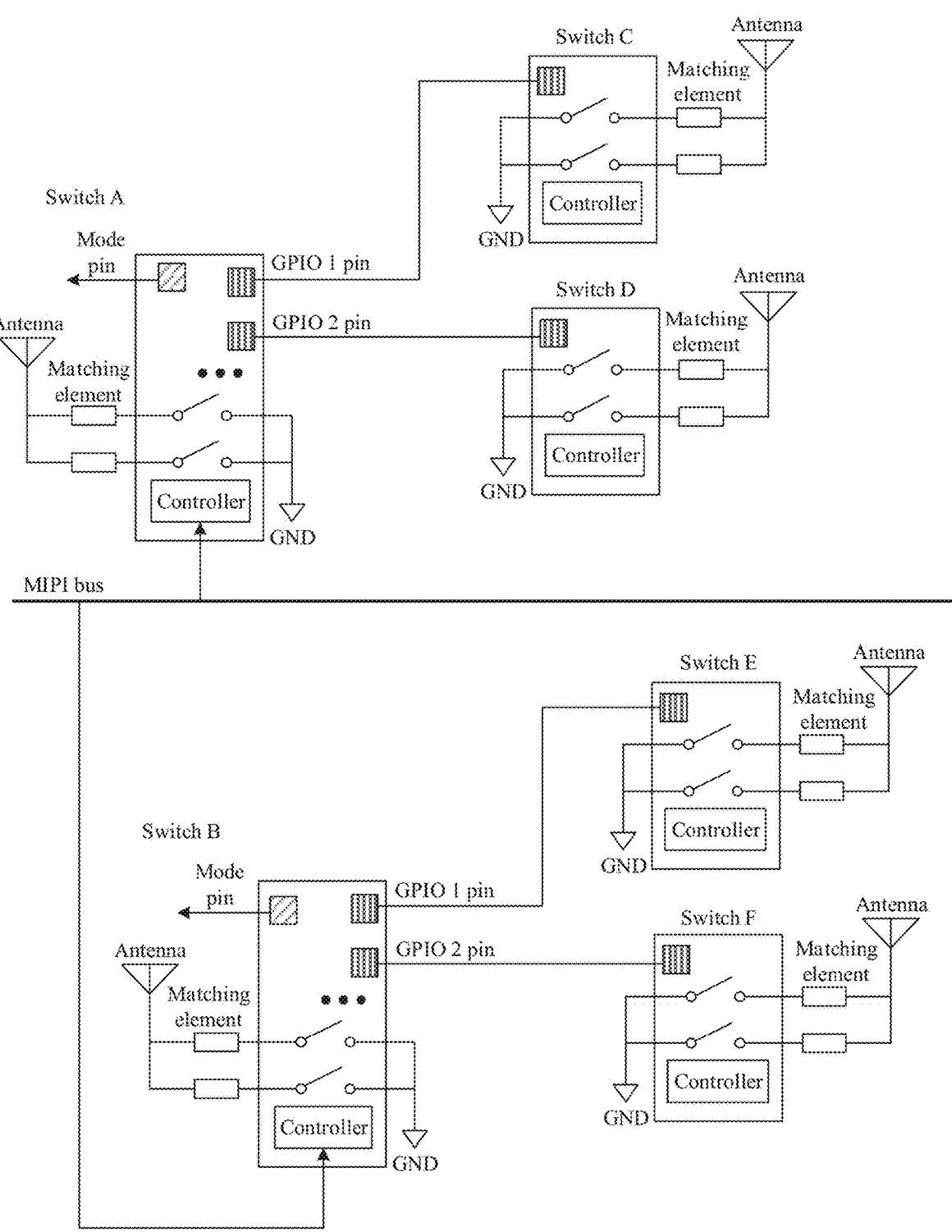
FIG. 18 is a schematic diagram of a connection of still another MIPI switch according to an embodiment of this application.

It should be further noted that a plurality of MIPI switches may be mounted on the MIPI bus. These MIPI switches may be connected to a plurality of GPIO switches. As shown in FIG. 18, a switch A and a switch B are mounted on the MIPI bus. The switch A is connected to a switch C through a GPIO_1 pin, and is connected to a switch D through a GPIO_2 pin. The switch B is connected to a switch E through the GPIO_1 pin, and is connected to a switch F through the GPIO_2 pin. If MIPI addresses of the switch A and the switch B are the same, an MIPI instruction whose address is the same as those of the switch A and the switch B may simultaneously control all the switch A, the switch B, the switch C, the switch D, the switch E, and the switch F.

S705. Switch a status of the MIPI switch based on the Y-bit instruction.

Specifically, the translator in the MIPI switch controls turn-off and turn-on of the sub-switch based on an output signal (that is, the Y-bit instruction) of the mode identification module, that is, an input signal of the translator is the output signal of the mode identification module. Alternatively, the translator in the MIPI switch controls turn-off and turn-on of the sub-switch based on an output signal of the data register, that is, an input signal of the translator is the output signal of the data register.

Similar to the logic of the mode identification module, logic for controlling the sub-switch by the translator based on the input signal may also be defined by using a truth table.

Figure 19:
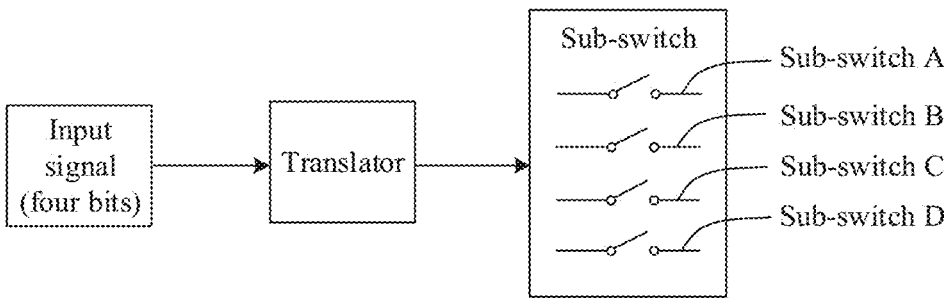
FIG. 19 is a schematic diagram of a principle of a translator according to an embodiment of this application.

For example, as shown in FIG. 19, an input signal of the translator has four bits. The translator controls four sub-switches based on the four-bit input signal: a sub-switch 1, a sub-switch 2, a sub-switch C, and a sub-switch D. As shown in Table 3, when the most significant bit of the input signal of the translator is 0, the translator keeps the sub-switch in an original status, and does not switch the status of the sub-switch; when the input signal of the translator is 1000 (ordered from the most significant bit to the least significant bit), the output signal is 0000, and the translator controls all sub-switches to be turned off; when the input signal of the translator is 1001 (ordered from the most significant bit to the least significant bit), the output signal is 0001, and the translator controls the sub-switch 1 to be turned on; when the input signal of the translator is 1010 (ordered from the most significant bit to the least significant bit), the output signal is 0010, and the translator controls the sub-switch 2 to be turned on; when the input signal of the translator is 1011 (ordered from the most significant bit to the least significant bit), the output signal is 0100, and the translator controls the sub-switch C to be turned on; and when the input signal of the translator is 1100 (ordered from the most significant bit to the least significant bit), the output signal is 1000, and the translator controls the sub-switch D to be turned on.

TABLE 3

| Serial number | Input signal | | | | Output signal | | | | Specific meaning |
|---|---|---|---|---|---|---|---|---|---|
| 1 | 0 | X | X | X | S | S | S | S | Keep an original status (do not switch a status of a sub-switch) |
| 2 | 1 | 0 | 0 | 0 | 0 | 0 | 0 | 0 | Turn off all sub-switches |
| 3 | 1 | 0 | 0 | 1 | 0 | 0 | 0 | 1 | Turn on a sub-switch 1 |
| 4 | 1 | 0 | 1 | 0 | 0 | 0 | 1 | 0 | Turn on a sub-switch 2 |
| 5 | 1 | 0 | 1 | 1 | 0 | 1 | 0 | 0 | Turn on a sub-switch C |
| 6 | 1 | 1 | 0 | 0 | 1 | 0 | 0 | 0 | Turn on a sub-switch D |

It should be noted that a flag bit may be set in the input signal of the translator (in the combination of the control instruction bits corresponding to different statuses of the mode pin). The flag bit includes K bits of a flag bit instruction. It may be understood that K is a positive integer not less than 1 and not greater than X. The translator may determine, based on the flag bit instruction, whether to switch the status of the sub-switch based on the input signal.

For example, the most significant bit of the input signal is set as the flag bit. When the mode pin is connected to a high level, the input signal of the translator is the most significant four bits (D4 to D7) in the data bits (D0 to D7) of the data register; and in this case, D7 is the flag bit. When the instruction D7 (the flag bit instruction) is 0, the translator does not switch the status of the sub-switch after receiving the input signal. When the instruction D7 (the flag bit instruction) is 1, the translator switches the status of the sub-switch based on the input signal after receiving the input signal. When the mode pin is connected to a low level, the input signal of the translator is the least significant four bits (D0 to D3) in the data bits (D0 to D7) of the data register; and in this case, D3 is the flag bit. When the instruction D3 (the flag bit instruction) is 0, the translator does not switch the status of the sub-switch after receiving the input signal. When the instruction D3 (the flag bit instruction) is 1, the translator switches the status of the sub-switch based on the input signal after receiving the input signal.

S706. The MIPI switch does not respond to the control instruction.

Specifically, when the MIPI address in the MIPI instruction is different from the MIPI address of the MIPI switch, the MIPI instruction is incapable of controlling the MIPI switch, that is, the MIPI switch does not respond to the control instruction in the MIPI instruction.

The following describes apparatuses provided in this application.

Figure 20:
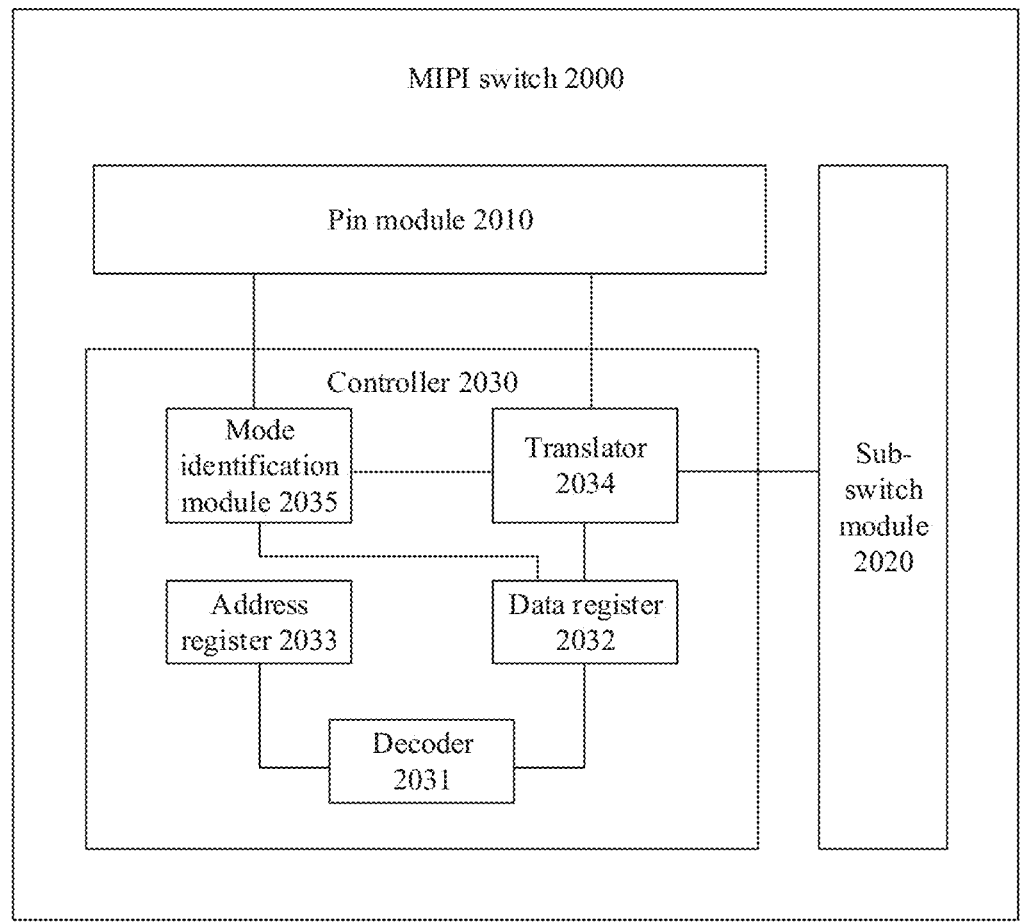
FIG. 20 is a schematic diagram of a structure of an MIPI switch according to an embodiment of this application.

This application provides an MIPI switch. As shown in FIG. 20, the MIPI switch can be used in the switch switching system shown in FIG. 6, and may be further used to perform the switch switching method shown in FIG. 7.

As shown in FIG. 20, an MIPI switch 2000 may include a pin module 2010, a sub-switch module 2020, and a controller 2030.

The pin module 2010 includes pins (pins) required for connecting the MIPI switch 2000 to a peripheral circuit. These pins are closely related to an internal structure of the MIPI switch 2000. In an embodiment of this application, the pin module 2010 includes a mode pin. In another embodiment of this application, the pin module 2010 includes a mode pin and at least one GPIO pin.

The sub-switch module 2020 includes at least one sub-switch, and the sub-switch may be connected to an antenna by using a matching element. When the sub-switch module 2020 includes a plurality of sub-switches, these sub-switches may be connected to the antenna by using different matching elements. The controller 2030 specifically implements related processing of an MIPI instruction. As shown in FIG. 20, the controller 2030 may include a decoder 2031, a data register 2032, an address register 2033, a translator 2034, and a mode identification module 2035. The decoder 2031 is configured to preliminarily parse a received MIPI instruction, to obtain an address and a control instruction in the MIPI instruction. The data register 2032 is configured to store the control instruction; and the data register 2032 may transmit a written control instruction to the mode identification module 2035 and the translator. The address register 2033 is configured to store an address of the MIPI switch 2000. The translator 2034 is configured to translate the control instruction into a component status. The mode identification module 2035 is configured to determine which control instruction bits specifically control the MIPI switch 2000. Specifically, the mode identification module 2035 identifies a status of the mode pin; determines, based on the status of the mode pin and logic of the mode identification module 2035, which control instruction bits control the MIPI switch 2000; and transmits the control instruction bits to the translator 2034.

It may be understood that the MIPI switch 2000 may further include more or fewer modules. The foregoing content is merely an implementation of this application, and is not considered as a limitation to this application.

This application further provides an electronic device, and the electronic device includes an MIPI switch 2000. It may be understood that the electronic device may be a device including the MIPI switch 2000, for example, a mobile phone, a PC, a tablet computer, a smartwatch, or a smart speaker.

Figure 21:
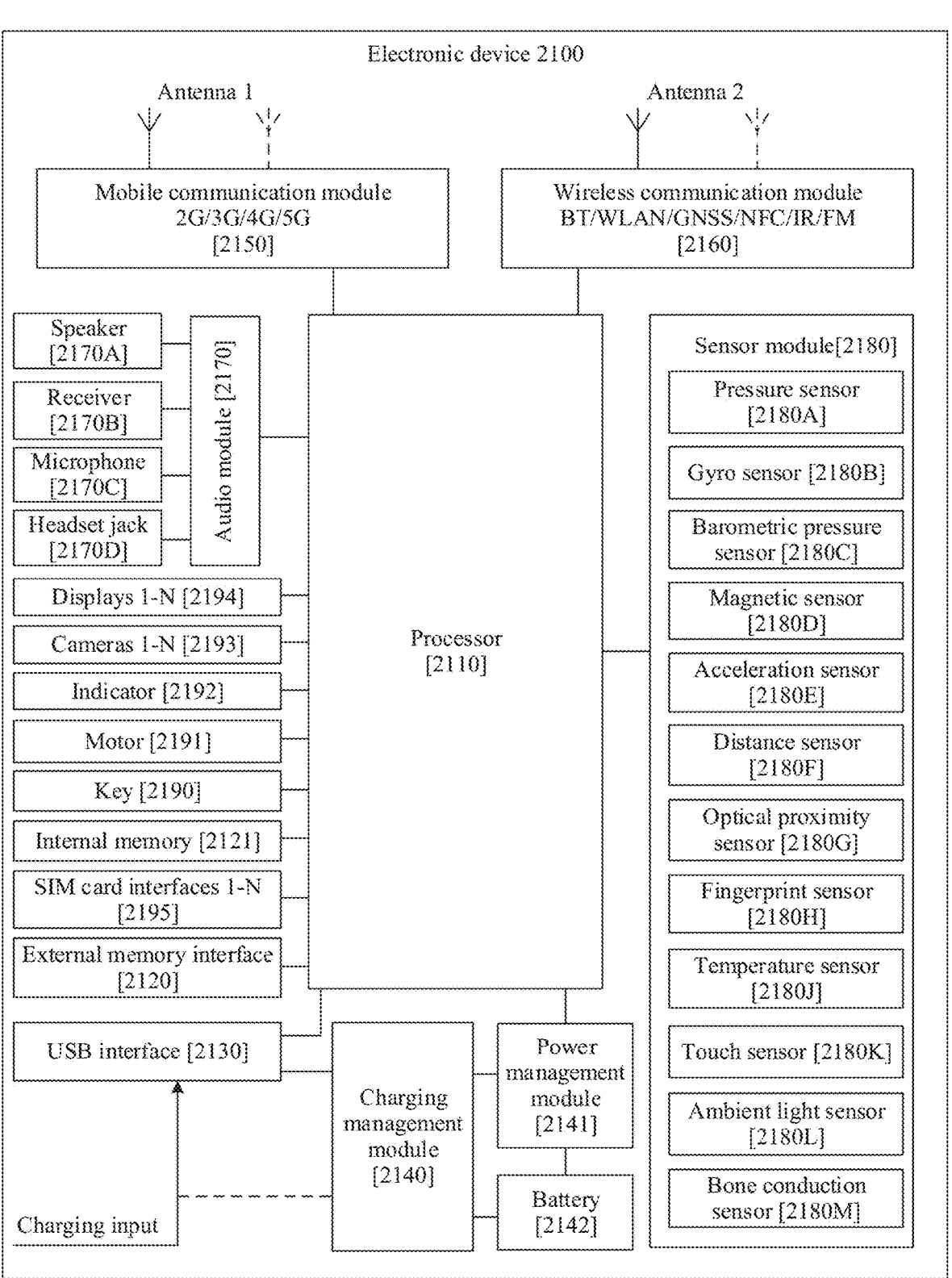
FIG. 21 is a schematic diagram of a structure of an electronic device according to an embodiment of this application.

For example, FIG. 21 is a schematic diagram of a structure of an electronic device according to this application. The electronic device includes the MIPI switch 2000. The following describes the electronic device 2100 shown in FIG. 21 in detail.

The electronic device 2100 may include a processor 2110, an external memory interface 2120, an internal memory 2121, a universal serial bus (Universal Serial Bus, USB) interface 2130, a charging management module 2140, a power management module 2141, a battery 2142, an antenna 1, an antenna 2, a mobile communication module 2150, a wireless communication module 2160, an audio module 2170, a speaker 2170A, a receiver 2170B, a microphone 2170C, a headset jack 2170D, a sensor module 2180, a key 2190, a motor 2191, an indicator 2192, a camera 2193, a display 2194, a subscriber identification module (Subscriber Identification Module, SIM) card interface 2195, and the like. The sensor module 2180 may include a pressure sensor 2180A, a gyro sensor 2180B, a barometric pressure sensor 2180C, a magnetic sensor 2180D, an acceleration sensor 2180E, a distance sensor 2180F, an optical proximity sensor 2180G, a fingerprint sensor 2180H, a temperature sensor 2180J, a touch sensor 2180K, an ambient light sensor 2180L, a bone conduction sensor 2180M, and the like.

It may be understood that the structure shown in this embodiment of the present invention does not constitute a specific limitation on the electronic device 2100. In some other embodiments of this application, the electronic device 2100 may include more or fewer components than those shown in the figure, or combine some components, or split some components, or have different component arrangements. The components shown in the figure may be implemented by hardware, software, or a combination of software and hardware.

The processor 2110 may include one or more processing units. For example, the processor 2110 may include an application processor (Application Processor, AP), a modem processor, a graphics processing unit (Graphics Processing unit, GPU), an image signal processor (Image Signal Processor, ISP), a controller, a memory, a video codec, a digital signal processor (Digital Signal Processor, DSP), a baseband processor, a neural-network processing unit (Neural-network Processing Unit, NPU), and/or the like. Different processing units may be independent components, or may be integrated into one or more processors.

The controller may be a nerve center and a command center of the electronic device 2100. The controller may generate an operation control signal based on instruction operation code and a time sequence signal, to control instruction retrieval and execute instruction.

It may be understood that the processor 2110 may further include an AE system. The AE system may be specifically set in the ISP. The AE system can be used to automatically adjust exposure parameters. Optionally, the AE system may be further integrated into another processor chip. This is not limited in this embodiment of this application.

In this embodiment provided in this application, the electronic device 2100 may perform a method for adjusting an exposure intensity by using the processor 2110.

The processor 2110 may be further provided with the memory for storing instructions and data. In some embodiments, the memory in processor 2110 is a cache memory. The memory can store an instruction or data that the processor 2110 has just used or used cyclically. If the processor 2110 needs to use the instruction or data again, the instruction or data can be directly invoked from the memory. Repeated access is avoided, and a waiting time of the processor 2110 is reduced, thereby improving system efficiency.

In some embodiments, the processor 2110 may include one or more interfaces. The interfaces may include an inter-integrated circuit (Inter-Integrated Circuit, I2C) interface, an inter-integrated circuit sound (Inter-Integrated Circuit Sound, I2S) interface, a pulse code modulation (Pulse Code Modulation, PCM) interface, a universal asynchronous receiver/transmitter (Universal Asynchronous Receiver/Transmitter, UART) interface, a mobile industry processor interface (Mobile Industry Processor Interface, MIPI), a general-purpose input/output (General-Purpose Input/Output, GPIO) interface, a subscriber identification module (Subscriber Identity Module, SIM) interface, a universal serial bus (Universal Serial Bus, USB) interface, and/or the like.

The I2C interface is a bidirectional synchronous serial bus, including one serial data line (Serial Data Line, SDA) and one serial clock line (Serial Clock Line, SCL). In some embodiments, the processor 2110 may include a plurality of groups of I2C buses. The processor 2110 may be coupled to the touch sensor 2180K, a charger, a flash, the camera 2193 and the like by using different I2C bus interfaces. For example, the processor 2110 may be coupled to the touch sensor 2180K by using an I2C interface, so that the processor 2110 communicates with the touch sensor 2180K by using the I2C bus interface, thereby implementing a touch function of the electronic device 2100.

The I2S interface can be used for audio communication. In some embodiments, the processor 2110 may include a plurality of groups of I2S buses. The processor 2110 may be coupled to the audio module 2170 by using the I2S bus to implement communication between the processor 2110 and the audio module 2170. In some embodiments, the audio module 2170 can transmit an audio signal to the wireless communication module 2160 by using the I2S interface, to implement a function of answering calls by using a Bluetooth headset.

The PCM interface can also be used for audio communication to sample, quantize and encode analog signals. In some embodiments, the audio module 2170 may be coupled to the wireless communication module 2160 by using a PCM bus interface. In some embodiments, the audio module 2170 can also transmit an audio signal to the wireless communication module 2160 by using the PCM interface, to implement a function of answering calls by using a Bluetooth headset. Both the I2S interface and the PCM interface can be used for audio communication.

The UART interface is a universal serial data bus used for asynchronous communication. The bus may be a bidirectional communication bus. The bus converts to-be-transmitted data between serial communication and parallel communication. In some embodiments, the UART interface is usually used to connect the processor 2110 to the wireless communication module 2160. For example, the processor 2110 communicates with a Bluetooth module in the wireless communication module 2160 through the UART interface, to implement a Bluetooth function. In some embodiments, the audio module 2170 can transmit an audio signal to the wireless communication module 2160 by using the UART interface, to implement a function of playing music by using a Bluetooth headset.

The MIPI interface may be configured to connect the processor 2110 to peripheral components such as the display 2194 and the camera 2193. The MIPI interface includes a camera serial interface (Camera Serial Interface, CSI), a display serial interface (Display Serial Interface, DSI), and the like. In some embodiments, the processor 2110 and the camera 2193 communicate with each other through the CSI interface, to implement a photographing function of the electronic device 2100. The processor 2110 and the display 2194 communicate with each other through the DSI interface, to implement a display function of the electronic device 2100.

The GPIO interface may be configured by using software. The GPIO interface may be configured as a control signal interface, or may be configured as a data signal interface. In some embodiments, the GPIO interface may be configured to connect the processor 2110 to the camera 2193, the display 2194, the wireless communication module 2160, the audio module 2170, the sensor module 2180, and the like. The GPIO interface may be alternatively configured as an I2C interface, an I2S interface, a UART interface, an MIPI interface, or the like.

The USB interface 2130 is an interface that complies with USB standard specifications, and may be specifically a Mini USB interface, a Micro USB interface, a USB Type C interface, or the like. The USB interface 2130 may be configured to connect to the charger to charge the electronic device 2100, or may be configured to transmit data between the electronic device 2100 and peripheral devices. The USB interface 2130 may be further configured to connect a headset and play audio by using the headset. The interface may be further configured to connect to another electronic device 2100, such as an AR device.

It can be understood that the interface connection relationship between the modules illustrated in the embodiments of the present invention is merely an example for description, and does not constitute a limitation on the structure of the electronic device 2100. In some other embodiments of this application, the electronic device 2100 may alternatively use an interface connection mode that is different from those in the foregoing embodiments, or use a combination of a plurality of interface connection modes.

The charging management module 2140 is configured to receive a charging input from a charger. The charger may be a wireless charger, or may be a wired charger. In some wired charging embodiments, the charging management module 2140 can receive a charging input of the wired charger by using the USB interface 2130. In some embodiments of wireless charging, the charging management module 2140 can receive a wireless charging input by using a wireless charging coil of the electronic device 2100. In addition to charging the battery 2142, the charging management module 2140 may further supply power to the electronic device 2100 by using the power management module 2141.

The power management module 2141 is configured to connect the battery 2142, the charging management module 2140, and the processor 2110. The power management module 2141 receives an input of the battery 2142 and/or an input of the charging management module 2140, and supplies power to the processor 2110, the internal memory 2121, the display 2194, the mobile communication module 2193, the wireless communication module 2160, and the like. The power management module 2141 may be further configured to monitor parameters such as a battery capacity, a quantity of battery cycles, and a battery health state (leakage or impedance). In some other embodiments, the power management module 2141 may alternatively be disposed in the processor 2110. In some other embodiments, the power management module 2141 and the charging management module 2140 may alternatively be disposed in a same component.

A wireless communication function of the electronic device 2100 may be implemented by using the antenna 1, the antenna 2, the mobile communication module 2150, the wireless communication module 2160, the modem processor, the baseband processor, and the like.

The antenna 1 and the antenna 2 are configured to transmit and receive electromagnetic wave signals. Each antenna in the electronic device 2100 may be configured to cover one or more communication bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communication module 2150 can provide a solution for wireless communication, including 2G/3G/4G/5G and the like, that is applied to the electronic device 2100. The mobile communication module 2150 may include at least one filter, a switch, a power amplifier, a low noise amplifier (Low Noise Amplifier, LNA), and the like. The mobile communication module 2150 can receive an electromagnetic wave by using the antenna 1, perform processing such as filtering and amplification on the received electromagnetic wave, and transmit a processed electromagnetic wave to the modem processor for demodulation. The mobile communication module 2150 can further amplify a signal that is modulated by the modem processor, and the signal is converted into an electromagnetic wave and radiated by the antenna 1. In some embodiments, at least some functional modules of the mobile communication module 2150 may be disposed in the processor 2110. In some embodiments, at least some functional modules of the mobile communication module 2150 may be disposed in the same component as at least some modules of the processor 2110.

The modem processor may include a modulator and a demodulator. The modulator is configured to adjust a to-be-sent low-frequency baseband signal to a medium-high-frequency signal. The demodulator is configured to demodulate a received electromagnetic wave signal into a low-frequency baseband signal. The demodulator then transmits a demodulated low-frequency baseband signal to the baseband processor for processing. After being processed by the baseband processor, the low-frequency baseband signal is transmitted to the application processor. The application processor outputs a sound signal by using an audio device (not limited to the speaker 2170A, the receiver 2170B, or the like), or displays an image or a video by using the display 2194. In some embodiments, the modem processor may be an independent component. In some other embodiments, the modem processor may be independent of the processor 2110 and disposed in a same component as the mobile communication module 2150 or another functional module.

The wireless communication module 2160 can provide a wireless communication solution applied to the electronic device 2100, including a wireless local area network (Wireless Local Area Networks, WLAN) (for example, a wireless fidelity (Wireless Fidelity, Wi-Fi) network), Bluetooth (Bluetooth, BT), a global navigation satellite system (Global Navigation Satellite System, GNSS), an FM (Frequency Modulation, FM), a near field communication (Near Field Communication, NFC) technology, an infrared (Infrared, IR) technology, and the like. The wireless communication module 2160 may be one or more components integrating at least one communication processing module. The wireless communication module 2160 receives an electromagnetic wave by using the antenna 2, performs frequency modulation and filtering on an electromagnetic wave signal, and sends a processed signal to the processor 2110. The wireless communication module 2160 can further receive a to-be-sent signal from the processor 2110, and perform frequency modulation and amplification on the signal, and the signal is converted into an electromagnetic wave and radiated by the antenna 2. In this embodiment, the wireless communication module 2160 is configured to implement interaction between a first device and a second device. For example, the first device has a wireless communication module, and the first device sends a verification request to the second device by using the module, and receives verification data sent by the second device.

In some embodiments, the antenna 1 of the electronic device 2100 is coupled to the mobile communication module 2150, and the antenna 2 is coupled to the wireless communication module 2160, so that the electronic device 2100 can communicate with a network and another device by using a wireless communication technology. The wireless communication technology may include a global system for mobile communications (Global System for Mobile Communications, GSM), a general packet radio service (General Packet Radio Service, GPRS), code division multiple access (Code Division Multiple Access, CDMA), wideband code division multiple access (Wideband Code Division Multiple Access, WCDMA), time-division code division multiple access (Time-Division Code Division Multiple Access, TD-SCDMA), long term evolution (Long Term Evolution, LTE), BT, GNSS, WLAN, NFC, FM, and IR technologies, and/or the like. The GNSS may include a global positioning system (Global Positioning System, GPS), a global navigation satellite system (Global Navigation Satellite System, GLO-NASS), a Beidou navigation satellite system (Beidou Navigation Satellite System, BDS), a quasi-zenith satellite system (Quasi-Zenith Satellite System, QZSS), a satellite based augmentation system (Satellite Based Augmentation Systems, SBAS), and/or the like.

The electronic device 2100 implements a display function by using the GPU, the display 2194, the application processor, and the like. The GPU is an image processing microprocessor, which is connected to the display 2194 and the application processor. The GPU is configured to perform mathematical and geometric calculations to render graphics. The processor 2110 may include one or more GPUs that execute program instructions to generate or change display information.

The display 2194 is configured to display an image, a video, and the like. The display 2194 includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flex light-emitting diode (Flex Light-Emitting Diode, FLED), a mini LED, a micro LED, a micro-OLED, a quantum dot light emitting diode (Quantum Dot Light Emitting Diodes, QLED), or the like. In some embodiments, the electronic device 2100 may include one or N displays 2194, where N is a positive integer greater than 1.

The electronic device 2100 may implement a capturing function by using the ISP, the camera 2193, the video codec, the GPU, the display 2194, the application processor, and the like.

The ISP is configured to process data fed back by the camera 2193. For example, when photographing, a shutter is enabled, light is transmitted to a camera photosensitive element through a lens, an optical signal is converted into an electrical signal, and the camera photosensitive element transmits the electrical signal to the ISP for processing, to convert the electrical signal into an image or a video visible to a naked eye. The ISP can further optimize algorithms for noise, brightness, and a skin color of the image. The ISP can further optimize parameters such as exposure and color temperature in a photographing scenario. In some embodiments, the ISP may be disposed in the camera 2193.

The camera 2193 is configured to capture a static image or video. An optical image is generated for an object through the lens and is projected to the photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transfers the electrical signal to the ISP. The ISP converts the electrical signal into a digital image or video signal. The ISP outputs the digital image or video signal to the DSP for processing. The DSP converts the digital image or video signal into an image or video signal in a standard format, for example, RGB or YUV. In some embodiments, the electronic device 2100 may include one or N cameras 2193, where N is a positive integer greater than 1. For example, in some embodiments, the electronic device 2100 may obtain images of a plurality of exposure coefficients by using the N cameras 2193. Further, during video post-processing, the electronic device 2100 may composite an HDR image based on the images of the plurality of exposure coefficients by using an HDR technology.

The digital signal processor is configured to process a digital signal. In addition to processing a digital image or video signal, the digital signal processor can further process another digital signal. For example, when the electronic device 2100 selects a frequency, the digital signal processor is configured to perform Fourier transform or the like on energy of the frequency.

The video codec is configured to compress or decompress a digital video. The electronic device 2100 may support one or more types of video codecs. Therefore, the electronic device 2100 may play or record videos in a plurality of encoding formats, such as moving picture experts group (Moving Picture Experts Group, MPEG) 1, MPEG 2, MPEG 3, and MPEG 4.

The NPU is a neural-network (Neural-Network, NN) computing processor. By referring to a structure of a biological neural network, such as a transfer mode between human brain neurons, the NPU quickly processes input information, and can further perform continuous self-learning. The NPU can implement applications such as intelligent cognition of the electronic device 2100, for example, image recognition, face recognition, voice recognition, and text understanding.

The external memory interface 2120 may be configured to connect to an external memory card, such as a micro SD card, to extend storage capability of the electronic device 2100. The external memory card communicates with the processor 2110 through the external memory interface 2120, to implement a data storage function. For example, music, video, and other files are stored in the external memory card.

The internal memory 2121 may be configured to store computer executable program code, and the executable program code includes instructions. The processor 2110 executes various functional applications and data processing of the electronic device 2100 by running the instructions stored in the internal memory 2121. The internal memory 2121 may include a program storage area and a data storage area. The program storage area may store an operating system, an application required by at least one function (for example, a sound play function or an image video play function), and the like. The data storage area may store data (such as audio data and a phone book) created during use of the electronic device 2100. In addition, the internal memory 2121 may include a high-speed random access memory, and may further include a non-volatile memory, such as at least one magnetic disk storage component, a flash memory component, and a universal flash memory (Universal Flash Storage, UFS).

The electronic device 2100 can implement audio functions (such as music playing and sound recording) by using the audio module 2170, the speaker 2170A, the receiver 2170B, the microphone 2170C, the headset jack 2170D, the application processor, and the like.

The audio module 2170 is configured to convert digital audio information into an analog audio signal for outputting, and is further configured to convert an analog audio input into a digital audio signal. The audio module 2170 may be further configured to encode and decode audio signals. In some embodiments, the audio module 2170 may be disposed in the processor 2110, or some functional modules of the audio module 2170 may be disposed in the processor 2110.

The speaker 2170A, also referred to as a "horn", is configured to convert an audio electrical signal into a sound signal. The electronic device 2100 can listen to music or answer a hands-free call by using the speaker 2170A.

The receiver 2170B, also referred to as an "earpiece", is configured to convert an audio electrical signal into a sound signal. When the electronic device 2100 receives a call or a voice message, the receiver 2170B can be placed close to an ear to receive the voice.

The microphone 2170C, also referred to as a "loudspeaker", is configured to convert a sound signal into an electrical signal. When making a call or sending a voice message, the user can make the mouth approach the microphone 2170C and emit a sound, to input a sound signal to the microphone 2170C. The electronic device 2100 may be provided with at least one microphone 2170C. In some other embodiments, the electronic device 2100 may be provided with two microphones 2170C, which can implement noise reduction function in addition to collecting sound signals. In some other embodiments, the electronic device 2100 may alternatively be provided with three, four, or more microphones 2170C to implement functions such as sound signal collection, noise reduction, sound source recognition, directional recording, and the like.

The headset jack 2170D is configured to connect to a wired headset. The headset jack 2170D may be the USB interface 2130, or may be a 3.5 mm open mobile terminal platform (Open Mobile Terminal Platform, OMTP) standard interface or a cellular telecommunications industry association of the USA (Cellular Telecommunications Industry Association of the USA, CTIA) standard interface.

The sensor module 2180 may include one or more sensors, which may be of a same type or different types. It may be understood that the sensor module 2180 shown in FIG. 1 is merely an example division manner, and there may be another division manner. This is not limited in this application.

The pressure sensor 2180A is configured to sense a pressure signal and can convert the pressure signal into an electrical signal. In some embodiments, the pressure sensor 2180A may be disposed on the display 2194. There are many types of pressure sensors 2180A, such as a resistive pressure sensor, an inductive pressure sensor, and a capacitive pressure sensor. The capacitive pressure sensor may include at least two parallel plates with conductive material. When a force is applied to the pressure sensor 2180A, a capacitance between electrodes changes. The electronic device 2100 determines a pressure intensity based on a change of the capacitance. When a touch operation is performed on the display 2194, the electronic device 2100 detects a touch operation intensity based on the pressure sensor 2180A. The electronic device 2100 can further calculate a touch position based on the detection signal of the pressure sensor 2180A.

In some embodiments, touch operations that are performed on a same touch position but have different touch operation intensities may correspond to different operation instructions. For example, when a touch operation whose touch operation intensity is less than a first pressure threshold is performed on a short message application icon, an instruction for viewing a short message is executed. When a touch operation whose touch operation intensity is greater than or equal to the first pressure threshold is performed on the short message application icon, an instruction for creating a short message is executed.

The gyro sensor 2180B may be configured to determine a movement posture of the electronic device 2100. In some embodiments, the gyro sensor 2180B may be configured to determine angular velocities of the electronic device 2100 around three axes (that is, x, y, and z axes). The gyro sensor 2180B can be used for image stabilization. For example, when the shutter is pressed, the gyro sensor 2180B detects a shake angle of the electronic device 2100, calculates a distance that a lens module needs to compensate based on the angle, and allows the lens to counteract the shake of the electronic device 2100 through reverse movement to implement image stabilization. The gyro sensor 2180B can further be used in navigation and somatosensory gaming scenarios.

The barometric pressure sensor 2180C is configured to measure a barometric pressure. In some embodiments, the electronic device 2100 calculates an altitude based on a barometric pressure value measured by the barometric pressure sensor 2180C, to assist in positioning and navigation.

The magnetic sensor 2180D includes a Hall sensor. The electronic device 2100 can use the magnetic sensor 2180D to detect opening and closing of a flip holster. In some embodiments, when the electronic device 2100 is a flip phone, the electronic device 2100 can detect opening and closing of a flip based on the magnetic sensor 2180D, so as to set features such as automatic unlocking of the flip based on the detected opening and closing state of the holster or the opening and closing state of the flip.

The acceleration sensor 2180E can detect magnitudes of acceleration of the electronic device 2100 in various directions (generally three axes). When the electronic device 2100 is still, a gravity and a direction may be detected. The acceleration sensor 2180E may be further configured to identify a posture of the electronic device 2100, and be used in applications such as switching between a landscape screen and a portrait screen, and a pedometer.

The distance sensor 2180F is configured to measure a distance. The electronic device 2100 may measure a distance by using infrared or laser. In some embodiments, in a photographing scenario, the electronic device 2100 can use the distance sensor 2180F to measure a distance to implement quick focusing.

The optical proximity sensor 2180G may include, for example, a light emitting diode (LED) and an optical detector such as a photodiode. The light emitting diode may be an infrared light emitting diode. The electronic device 2100 emits infrared light outward by using the light-emitting diode. The electronic device 2100 uses the photodiode to detect infrared reflected light from a nearby object. When sufficient reflected light is detected, it can be determined that there is an object near the electronic device 2100. When insufficient reflected light is detected, the electronic device 2100 can determine that there is no object near the electronic device 2100. The electronic device 2100 can use the optical proximity sensor 2180G to detect that the user holds the electronic device 2100 close to the ear, to automatically turn off the screen to save power. The optical proximity sensor 2180G may alternatively be used in a holster mode or a pocket mode to automatically unlock or lock the screen.

The ambient light sensor 2180L is configured to sense brightness of ambient light. The electronic device 2100 can adaptively adjust brightness of the display 2194 based on the sensed brightness of the ambient light. The ambient light sensor 2180L can also be configured to automatically adjust white balance during photographing. The ambient light sensor 2180L can further cooperate with the optical proximity sensor 2180G to detect whether the electronic device 2100 is in a pocket, to prevent accidental touch.

The fingerprint sensor 2180H is configured to obtain a fingerprint. The electronic device 2100 can use the obtained fingerprint characteristics to implement fingerprint-based unlocking, application lock accessing, fingerprint-based photographing, fingerprint-based incoming call receiving, and the like.

The temperature sensor 2180J is configured to detect a temperature. In some embodiments, the electronic device 2100 executes a temperature processing policy based on the temperature detected by the temperature sensor 2180J. For example, when a temperature reported by the temperature sensor 2180J exceeds a threshold, the electronic device 2100 degrades performance of a processor located near the temperature sensor 2180J, to reduce power consumption and implement thermal protection. In some other embodiments, when the temperature is lower than another threshold, the electronic device 2100 heats the battery 2142, to avoid abnormal shutdown of the electronic device 2100 due to a low temperature. In some other embodiments, when the temperature is lower than still another threshold, the electronic device 2100 boosts an output voltage of the battery 2142, to avoid abnormal shutdown due to a low temperature.

The touch sensor 2180K is also referred to as a "touch panel". The touch sensor 2180K may be disposed on the display 2194, and the touch sensor 2180K and the display 2194 form a touchscreen, which is also referred to as a "touch-controlled screen". The touch sensor 2180K is configured to detect a touch operation performed on or near the touch sensor 2180K. The touch sensor can transmit a detected touch operation to the application processor to determine a type of a touch event. The display 2194 may be configured to provide a visual output related to the touch operation. In some other embodiments, the touch sensor 2180K may alternatively be disposed on a surface of the electronic device 2100, which is different from the position of the display 2194.

In an embodiment of this application, when a user performs time-lapse photographing or burst shooting by using the electronic device 2100, a series of images need to be obtained. In a time-lapse photographing or burst shooting scenario, the electronic device 2100 may use an AE mode. That is, the electronic device 2100 automatically adjusts an AE value. In a process of previewing the series of images, if the user performs a touch operation on the display 2194, a touch AE mode may be triggered. In the touch AE mode, the electronic device 2100 may adjust brightness of a corresponding position of the display touched by the user, and perform high-weight light measurement. When an average brightness of a picture is calculated, a weight of a touch area of the user is significantly greater than another area. Finally, a calculated average brightness of the picture is closer to an average brightness of the touch area of the user.

The bone conduction sensor 2180M can obtain a vibration signal. In some embodiments, the bone conduction sensor 2180M can obtain a vibration signal obtained from bone mass vibration by a human voice part. The bone conduction sensor 2180M can be further in contact with the human pulse to receive a blood pressure and pulse signal. In some embodiments, the bone conduction sensor 2180M may alternatively be disposed in a headset to be combined into a bone conduction headset. The audio module 2170 can obtain a speech signal through parsing based on the vibration signal that is obtained by the bone conduction sensor 2180M from bone mass vibration by the voice part, to implement a speech function. The application processor can parse heart rate information based on the blood pressure and pulse signal obtained by the bone conduction sensor 2180M, to implement a heart rate detection function.

The key 2190 includes a power-on key, a volume key, or the like. The key 2190 may be a mechanical key, or may be a touch key. The electronic device 2100 can receive a key input, and generate a key signal input related to user setting and function control of the electronic device 2100.

The motor 2191 can generate a vibration prompt. The motor 2191 may be configured to provide an incoming call vibration prompt, or may be configured to provide a touch vibration feedback. For example, a touch operation performed on different applications (such as photographing and audio playing) may be corresponding to different vibration feedback effects. The motor 2191 may also correspond to different vibration feedback effects for touch operations performed on different areas of the display 2194. Different application scenarios (such as time reminding, receiving information, alarm clock and games) also correspond to different vibration feedback effects. A touch vibration feedback effect may further be customized.

The indicator 2192 may be an indicator light, which may be configured to indicate a charging state and a power change, or to indicate a message, a missed call, a notification, or the like.

The SIM card interface 2195 is configured to connect to a SIM card. The SIM card may be inserted into the SIM card interface 2195 or removed from the SIM card interface 2195 to implement contact and separation from the electronic device 2100. The electronic device 2100 can support 1 or N SIM card interfaces, where N is a positive integer greater than 1. The SIM card interface 2195 can support the Nano SIM card, the Micro SIM card, the SIM card, and the like. A same SIM card interface 2195 may be connected to a plurality of cards. The plurality of cards may be of the same type or different types. The SIM card interface 2195 can also be compatible with different types of SIM cards. The SIM card interface 2195 can also be compatible with an external memory card. The electronic device 2100 interacts with a network by using the SIM card, to implement functions such as making a call and data communication. In some embodiments, the electronic device 2100 uses an eSIM, that is, an embedded SIM card. The eSIM card may be embedded in the electronic device 2100 and cannot be separated from the electronic device 2100.

The foregoing embodiments are only used to illustrate the technical solutions of this application, but are not used to limit this application. Although this application has been described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the scope of the technical solutions of the embodiments of this application.

What is claimed is:

1. A mobile industry processor interface (MIPI) switch, comprising:

a pin module comprising a first pin;

a sub-switch module comprising at least one sub-switch; and a controller, configured to:

receive an MIPI instruction that comprises a control instruction and address bit, wherein the address bit is configured to represent address information of the MIPI instruction;

determine a Y-bit instruction in the control instruction based on a status of the first pin when the address information included in the MIPI instruction is configured to control the same address information as the MIPI switch, wherein the control instruction comprises an X-bit instruction, and wherein Y is less than or equal to X; and switch the at least one sub-switch based on the Y-bit instruction, wherein the controller comprises:

an address register configured to store a first MIPI address, wherein the MIPI instruction comprises a second MIPI address;

a decoder configured to:

parse the MIPI instruction to obtain the second MIPI address and the control instruction; and determine whether the first MIPI address is the same as the second MIPI address;

a data register configured to store the control instruction; and a mode identification module configured to determine the Y-bit instruction in the control instruction based on the status of the first pin when the first MIPI address is the same as the second MIPI address.

2. The MIPI switch of claim 1, wherein the Y-bit instruction is a first Y-bit instruction, wherein the control instruction includes a second Y-bit instruction, and wherein the second Y-bit instruction is configured to switch a sub-switch of another MIPI switch.

3. The MIPI switch of claim 1, wherein the first pin has N statuses, and wherein when being configured to determine the Y-bit instruction in the control instruction based on the status of the first pin, the mode identification module is configured to determine, based on first control logic, the Y-bit instruction that is in the control instruction and that is corresponding to the status of the first pin, wherein the first control logic comprises correspondences between the N statuses and Y-bit instructions, and wherein different statuses correspond to different Y-bit instructions in the control instruction.

4. The MIPI switch of claim 3, wherein a K-bit instruction in the Y-bit instruction is a flag bit instruction, wherein K is a positive integer greater than or equal to 1 and less than or equal to X, and wherein the controller further comprises a translator configured to switch the at least one sub-switch based on the Y-bit instruction by:

skipping responding to the Y-bit instruction if the flag bit instruction indicates a first state; and responding to the Y-bit instruction if the flag bit instruction indicates a second state.

5. The MIPI switch of claim 4, further comprising general-purpose input/output (GPIO) pins, wherein at least one of the GPIO pins is connected to a GPIO switch, wherein different GPIO pins are connected to different GPIO switches, and wherein the translator is further configured to:

determine, based on second control logic, a Z-bit instruction that is in the control instruction and that is corresponding to the GPIO pins, wherein the second control logic comprises correspondences between the GPIO pins and Z-bit instructions, wherein different GPIO pins correspond to different Z-bit instructions in the control instruction, and wherein Z is less than or equal to X; and switch the GPIO switch based on the Z-bit instruction.

6. The MIPI switch of claim 5, wherein the Y-bit instruction is a first Y-bit instruction, wherein the control instruction includes a second Y-bit instruction, and wherein the second Y-bit instruction is configured to switch a sub-switch of another MIPI switch.

7. A switch switching method, implemented by a mobile industry processor interface (MIPI) switch comprising a pin module comprising a first pin and a sub-switch module comprising at least one sub-switch, wherein the method comprises:

receiving an MIPI instruction comprising a control instruction;

determining a Y-bit instruction in the control instruction based on a status of the first pin when it is determined that the MIPI instruction is configured to control the MIPI switch, wherein the control instruction comprises an X-bit instruction, and wherein Y is less than or equal to X, wherein the MIPI switch corresponds to a first MIPI address, wherein the MIPI instruction comprises a second MIPI address, and wherein determining the Y-bit instruction in the control instruction further comprises:

parsing the MIPI instruction to obtain the second MIPI address and the control instruction;

determining whether the first MIPI address is the same as the second MIPI address; and determining the Y-bit instruction in the control instruction based on the status of the first pin if the first MIPI address is the same as the second MIPI address; and switching the at least one sub-switch based on the Y-bit instruction.

8. The method of claim 7, wherein the Y-bit instruction is a first Y-bit instruction, wherein the control instruction includes a second Y-bit instruction, and wherein the method further comprises switching a sub-switch of another MIPI switch based on the second Y-bit instruction.

9. The method of claim 7, wherein the first pin has N statuses, and wherein determining the Y-bit instruction in the control instruction based on the status of the first pin comprises determining, based on first control logic, the Y-bit instruction that is in the control instruction and that is corresponding to the status of the first pin, wherein the first control logic comprises correspondences between the N statuses and Y-bit instructions, and wherein different connection statuses correspond to different Y-bit instructions in the control instruction.

10. The method of claim 9, wherein a K-bit instruction in the Y-bit instruction is a flag bit instruction, wherein K is a positive integer greater than or equal to 1 and less than or equal to X, and wherein switching the at least one sub-switch based on the Y-bit instruction comprises:

skipping responding to the Y-bit instruction if the flag bit instruction indicates a first state; and responding to the Y-bit instruction if the flag bit instruction indicates a second state.

11. The method of claim 10, wherein the MIPI switch further comprises general-purpose input/output (GPIO) pins, wherein at least one of the GPIO pins in the MIPI switch is connected to a GPIO switch, wherein different GPIO pins are connected to different GPIO switches, and wherein the method further comprises:

determining, based on second control logic, a Z-bit instruction that is in the control instruction and that is corresponding to the GPIO pins, wherein the second control logic comprises correspondences between the GPIO pins and Z-bit instructions, wherein different GPIO pins correspond to different Z-bit instructions in the control instruction, and wherein Z is less than or equal to X; and switching the GPIO switch based on the Z-bit instruction.

12. The method of claim 11, wherein the Y-bit instruction is a first Y-bit instruction, wherein the control instruction includes a second Y-bit instruction, and wherein the method further comprises switching a sub-switch of another MIPI switch based on the second Y-bit instruction.

13. An electronic device, comprising:

an antenna; and a mobile industry processor interface (MIPI) switch, comprising:

a pin module comprising a first pin;

a sub-switch module comprising at least one sub-switch coupled to the antenna; and a controller, configured to:

receive an MIPI instruction that comprises a control instruction and address bit, wherein the address bit is configured to represent address information of the MIPI instruction;

determine a Y-bit instruction in the control instruction based on a status of the first pin when the address information included in the MIPI instruction is configured to control the same address information as the MIPI switch, wherein the Y-bit instruction is a first Y-bit instruction, wherein the control instruction comprises an X-bit instruction, wherein Y is less than or equal to X, wherein the control instruction includes a second Y-bit instruction, and wherein the second Y-bit instruction is configured to switch a sub-switch of another MIPI switch; and switch the at least one sub-switch based on the Y-bit instruction.

14. The electronic device of claim 13, wherein the controller comprises:

an address register configured to store a first MIPI address, wherein the MIPI instruction comprises a second MIPI address;

a decoder configured to:

parse the MIPI instruction to obtain the second MIPI address and the control instruction; and determine whether the first MIPI address is the same as the second MIPI address;

a data register configured to store the control instruction; and a mode identification module configured to determine the Y-bit instruction in the control instruction based on the status of the first pin when the first MIPI address is the same as the second MIPI address.

15. The electronic device of claim 14, wherein the first pin has N statuses, and wherein when being configured to determine the Y-bit instruction in the control instruction based on the status of the first pin, the mode identification module is configured to determine, based on first control logic, the Y-bit instruction that is in the control instruction and that is corresponding to the status of the first pin, wherein the first control logic comprises correspondences between the N statuses and Y-bit instructions, and wherein different statuses correspond to different Y-bit instructions in the control instruction.

16. The electronic device of claim 15, wherein a K-bit instruction in the Y-bit instruction is a flag bit instruction, wherein K is a positive integer greater than or equal to 1 and less than or equal to X, and wherein the controller further comprises a translator configured to switch the at least one sub-switch based on the Y-bit instruction by:

skipping responding to the Y-bit instruction if the flag bit instruction indicates a first state; and responding to the Y-bit instruction if the flag bit instruction indicates a second state.

17. The electronic device of claim 16, wherein the MIPI switch further comprises general-purpose input/output (GPIO) pins, wherein at least one of the GPIO pins is connected to a GPIO switch, wherein different GPIO pins are connected to different GPIO switches, and wherein the translator is further configured to:

determine, based on second control logic, a Z-bit instruction that is in the control instruction and that is corresponding to the GPIO pins, wherein the second control logic comprises correspondences between the GPIO pins and Z-bit instructions, wherein different GPIO pins correspond to different Z-bit instructions in the control instruction, and wherein Z is less than or equal to X; and switch the GPIO switch based on the Z-bit instruction.

* * * * *